(12) United States Patent
Frederick, Jr. et al.

(10) Patent No.: US 6,383,295 B1
(45) Date of Patent: May 7, 2002

(54) TIRE DRESSING APPARATUS

(76) Inventors: William M. Frederick, Jr., 519 E. High Point Rd., Peoria, IL (US) 61614; Bryant P. Ruder, 508 Ridge La., Eureka, IL (US) 61530; Stanley R. Weber, R.R.# 4, Pontiac, IL (US) 61764

(*) Notice: Subject to any disclaimer, the term of this patent is extended or adjusted under 35 U.S.C. 154(b) by 0 days.

(21) Appl. No.: 09/567,199

(22) Filed: May 8, 2000

(51) Int. Cl.[7] .......................... B05C 13/00; B60S 3/04
(52) U.S. Cl. ...................... 118/680; 134/45; 134/123
(58) Field of Search ............................ 118/668, 676, 118/679, 680, 669, 708, 323, 500, 505; 134/44, 45, 49, 52, 123, 125, 129, 32, 18; 239/73; 15/53.1, 97.3

(56) References Cited

U.S. PATENT DOCUMENTS

| | | | |
|---|---|---|---|
| 3,191,207 A | 6/1965 | Van Brakel | 15/21 |
| 3,731,332 A | 5/1973 | Bernardi | 15/21 E |
| 4,550,464 A | 11/1985 | Messing | 15/53 |
| 4,830,033 A | 5/1989 | Hanna | 134/45 |
| 4,971,084 A | 11/1990 | Smith et al. | 134/45 |
| 5,266,123 A | 11/1993 | Brand | 134/26 |
| 5,309,931 A | 5/1994 | Meyer, III | 134/57 R |
| 5,341,828 A | 8/1994 | Ferguson, Sr. | 134/123 |
| 5,363,865 A | 11/1994 | Brand | 134/56 R |
| 5,432,974 A | 7/1995 | Yasutake et al. | 15/316.1 |
| 5,497,797 A | 3/1996 | Meyer, III | 134/57 R |
| 5,778,908 A | 7/1998 | Shelstad | 134/123 |

*Primary Examiner*—Richard Crispino
*Assistant Examiner*—Yewebdar T Tadesse
(74) *Attorney, Agent, or Firm*—Suelthaus & Walsh, P.C.

(57) ABSTRACT

The tire dressing apparatus is controlled by a carwash controller operated typically by an attendant at the carwash. The width of a vehicle entering the carwash is determined mechanically by an index arm, the identification of the vehicle selected for application of the tire dressing fluid to the vehicle's tires, and a programmable logic controller controls a spraying sequence by controlling the time intervals between the activation of solenoids controlling fluid release through nozzles during each vehicle tire dressing cycle. The programmable logic controller includes sufficient memory to keep track of the vehicle in the carwash que or in the carwash in the event of some mechanical or electrical interruptions to the carwash operation. A unique nozzle design has been provided to obtain the desired fluid distribution and coverage on the vehicle tires.

4 Claims, 35 Drawing Sheets

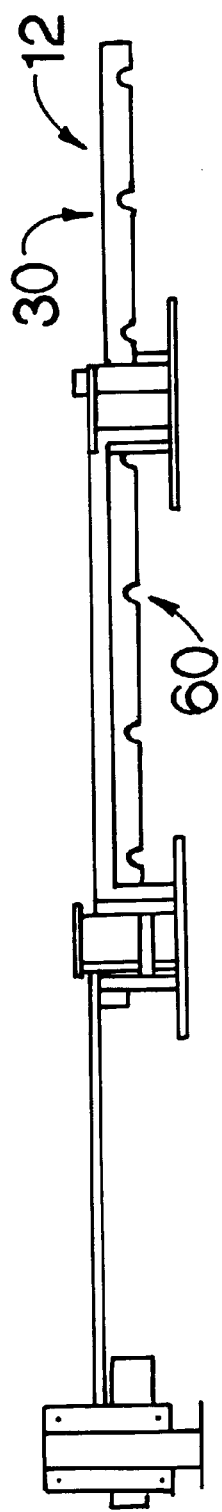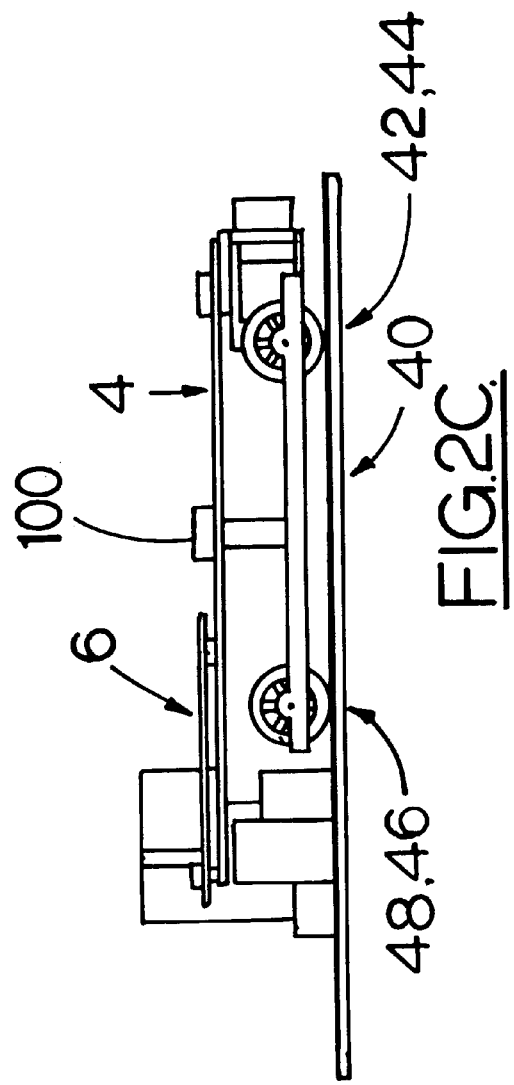

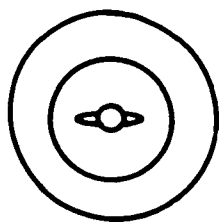 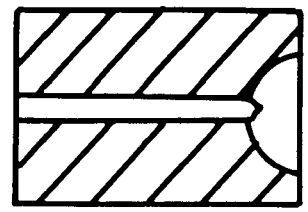
FIG. 15.
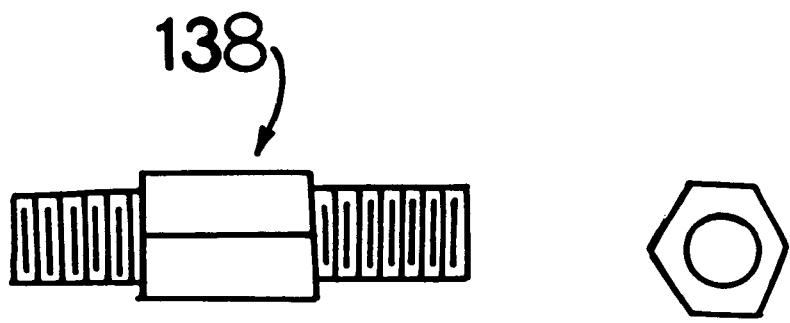
FIG. 16.

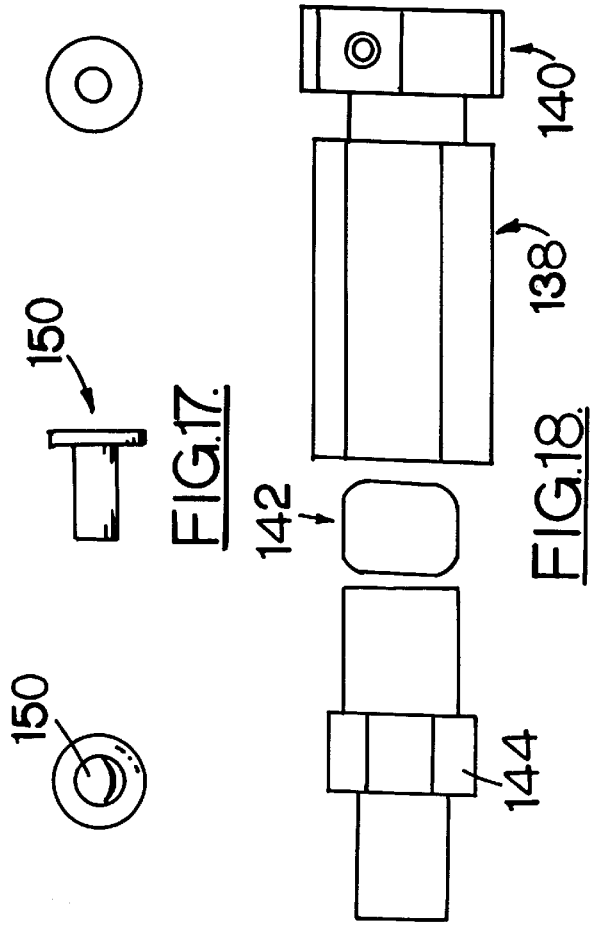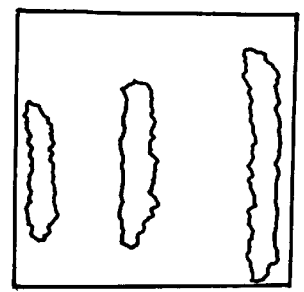

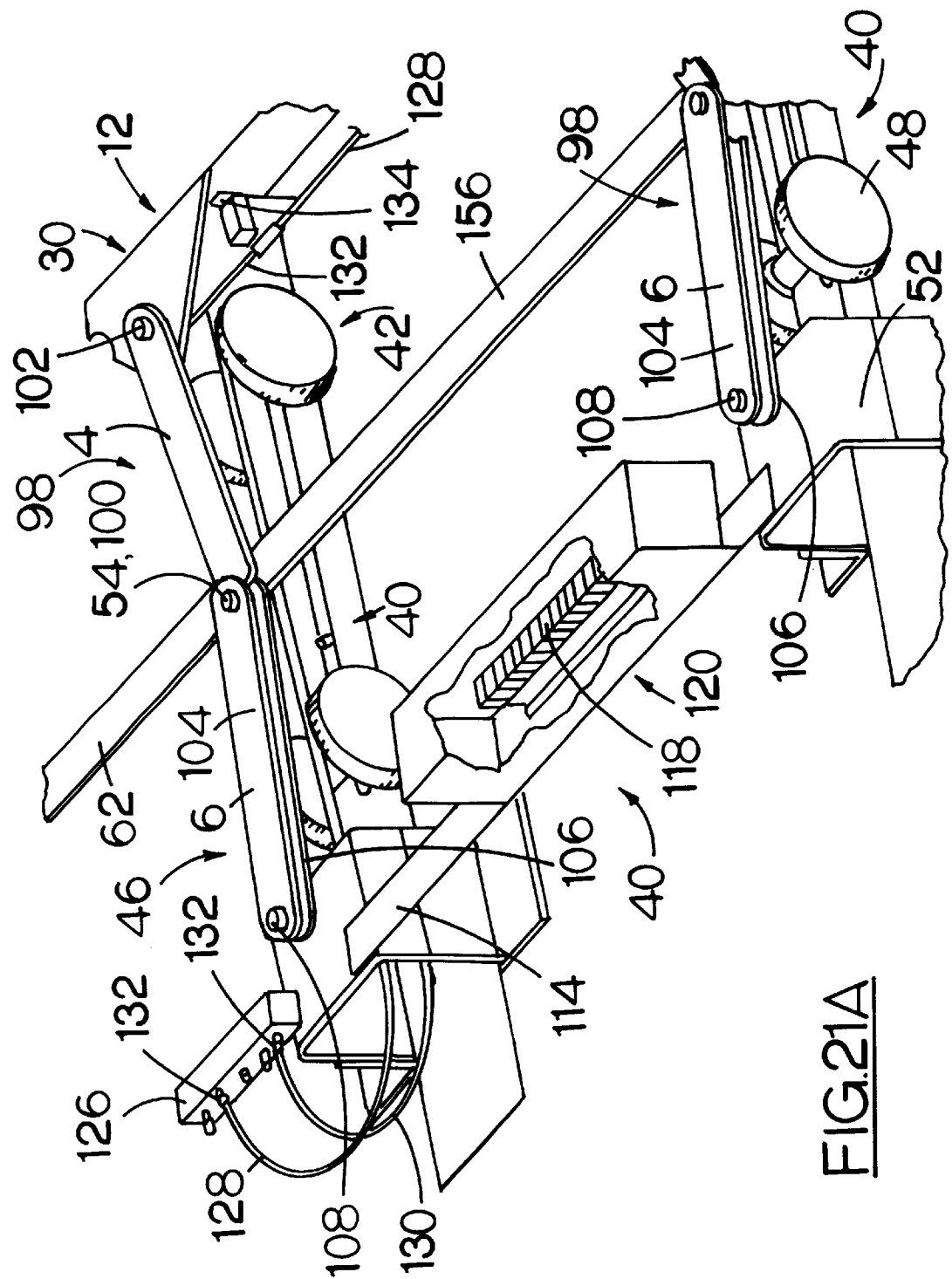

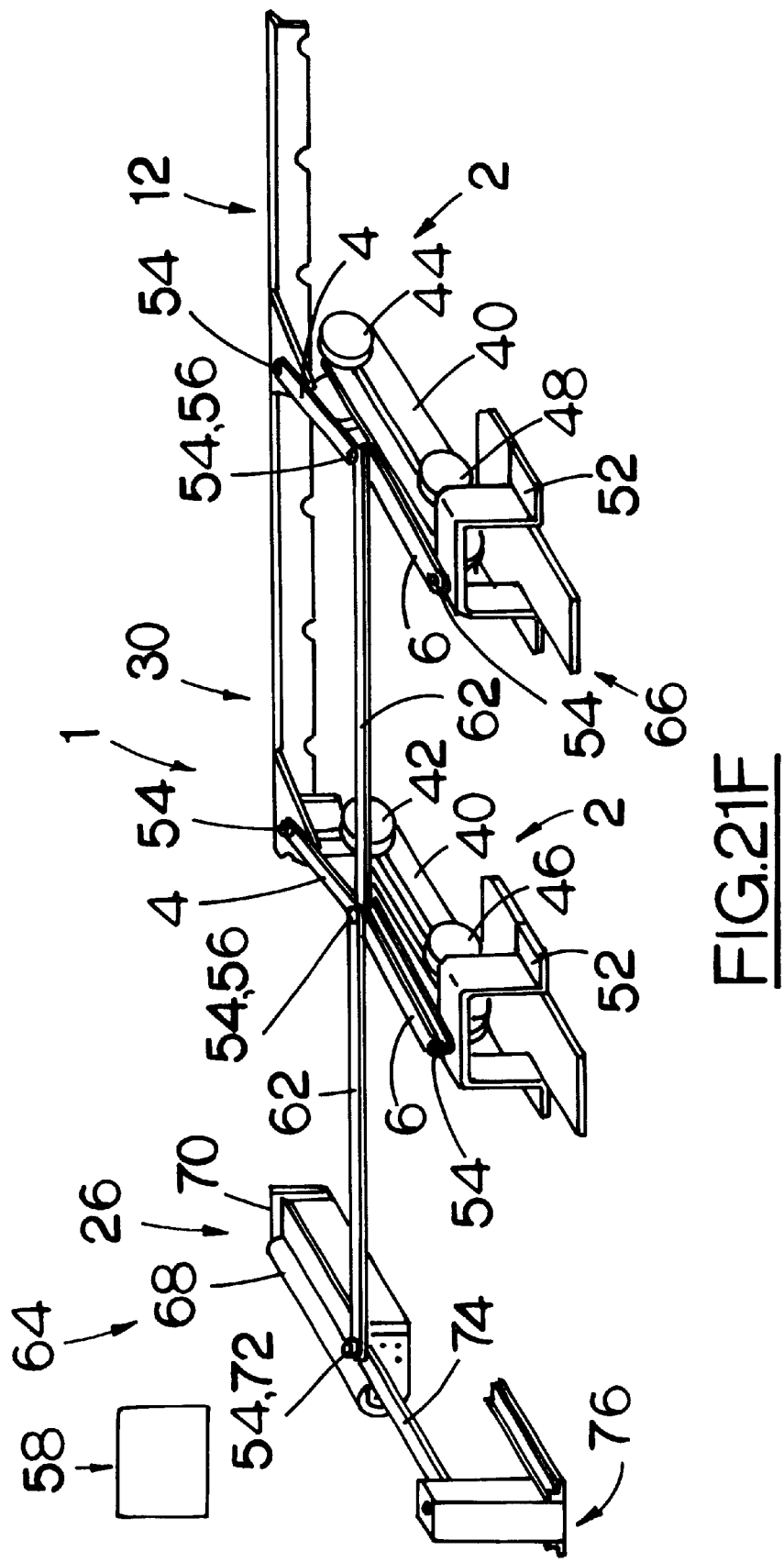

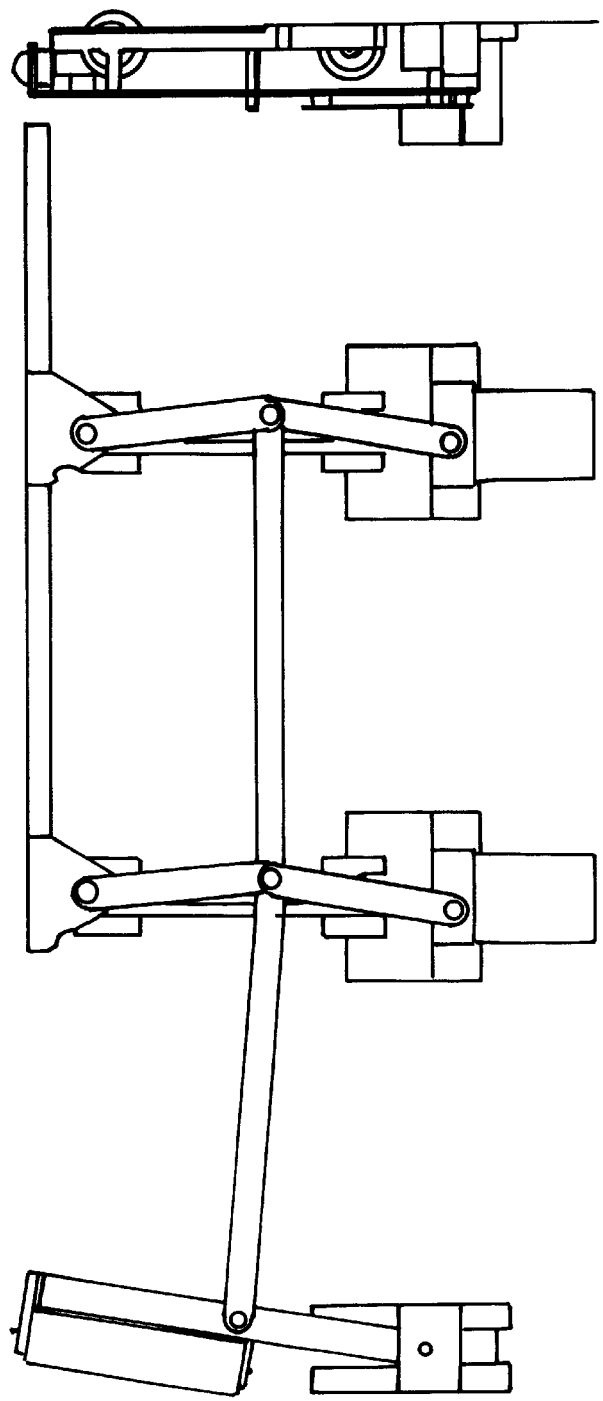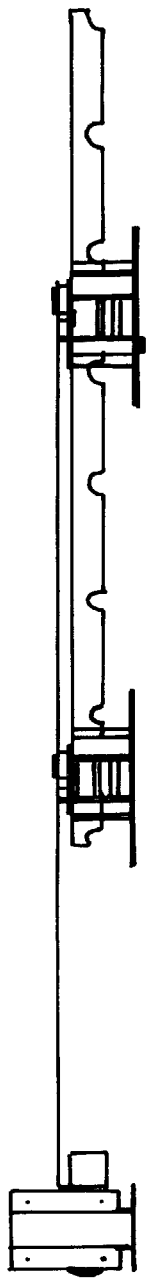
FIG. 21L

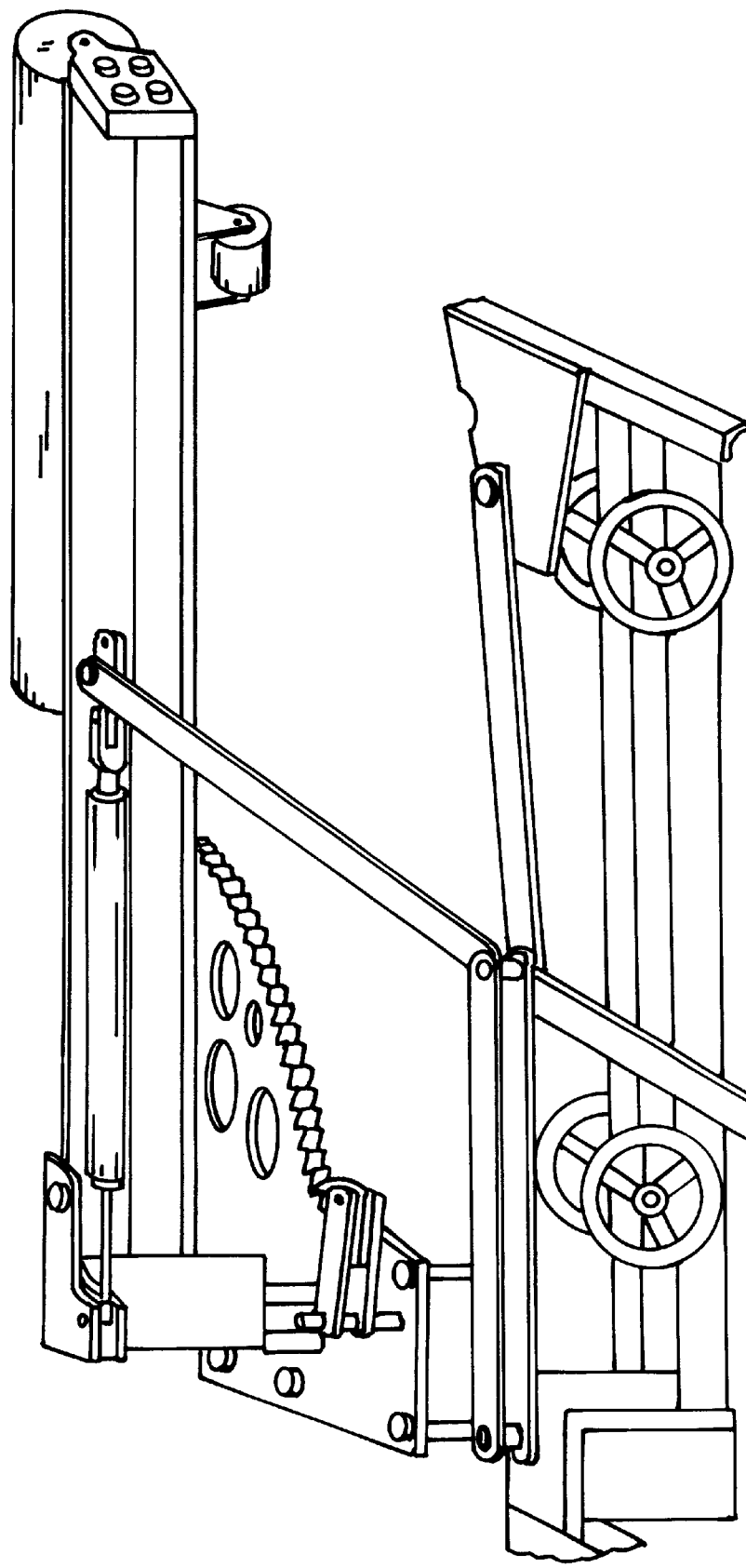

TIRE DRESSING APPARATUS

BACKGROUND OF THE INVENTION

The technical character of the present invention relates in general to applying a tire dressing material to tires of a vehicle in a carwash and pertains, more particularly, to a tire dressing apparatus located within the carwash. The tire dressing apparatus of this invention is an improvement over the conventional approach of applying the tire dressing fluid after the vehicle exits the carwash.

A technical problem recognized with respect to conventional methods of applying the tire dressing fluid relates to applying the tire dressing fluid manually after the vehicle exits an automatic portion of the carwash. The manual sprayers and pump bottles typically used to manually apply the tire dressing fluid tend to waste the tire dressing fluid and often do not provide sufficient coverage of the tire with the tire dressing fluid to obtain the desired result, that is, the look of a well-dressed tire.

Tire dressing is a feature commonly offered at automatic carwash facilities that finish the vehicle (e.g., manually dry the vehicle exterior, manually clean the vehicle interior) following the vehicle's exit from the automatic portion of the carwash. The application of the tire dressing fluid (e.g., ARMORALL brand silicone spray or liquid) is desired by the vehicle's owner for the shine it typically leaves on the outside facing surface of the vehicle's tires.

Another technical problem associated with conventional tire dressing fluids relates to their chemical composition. The conventional chemicals used for tire dressing (e.g., silicone based chemicals) require a relatively clean tire for adhesion of the chemical to the tire surface and similarly a dry tire thereby preventing unwanted dilution of the chemical tire dressing fluid resulting in a surface without the characteristic dressed tire shine.

The conditions in a conventional carwash and the composition of tire dressing fluids usually require application of the tire dressing fluid or other similar protective or finishing chemicals immediately after cleaning. Application of the chemical to a dirty tire can result in insufficient adherence of the chemical to the tire thereby resulting in a finish unacceptable to the vehicle owner.

In anticipation of the tire dressing fluid industry developing a tire dressing compound that can be applied to a wet tire that passes through a conventional air drying portion of the carwash and still achieve the desired "dressing" effect on the tire, a need was perceived for a tire dressing apparatus including dispensing equipment suitable for applying the tire dressing fluid in a wet environment during the carwash and then conveying the vehicle through the air drying portion of the carwash without loosing so much of the tire dressing fluid that the desired dressed tire shine would not be achieved.

Previous attempts to solve these technical problems resulted in systems that operated on a principle that required the dispensing equipment to locate a vehicle tire, determine its size, physically track the tire through the tire dressing application portion of the carwash, and apply the tire dressing as the dispensing equipment moved along with the vehicle tires through the tire dressing portion of the carwash.

Application of a fluid (i.e., the tire dressing or other equivalent chemical or silicone composition) to the tire is preferably done during the carwash, however, a tire dressing fluid applied during the carwash must have the ability to wet the surface of an already wet tire and remain on the tire during the remainder of the carwash, including a drying portion of the carwash. Providing a single tire dressing apparatus capable of a applying the tire dressing fluid to tires of different sizes on vehicles of different sizes is another technical problem that has to be overcome, and it is a technical problem considered just as important and as challenging to overcome as any of the other technical problems discussed with respect to this invention.

The technical field of the invention is tire dressing fluid dispensing equipment and application of the tire dressing fluid in a desired pattern through a nozzle designed to distribute the tire dressing fluid and a tire dressing neutralizer onto the vehicle tire and floor of the carwash, respectively, as the vehicle's tires move through the tire dressing application portion of the carwash. The technical problems addressed by the invention include locating a vehicle tire, adjusting the dispensing equipment to accommodate each particular tire size of each particular vehicle conveyed through the carwash, sensing the tire speed, and applying the tire dressing fluid and the neutralizer fluid in a desired amount and pattern as the vehicle's tires pass or approach a plurality of fluid dispensing nozzles.

Accordingly, it is an object of the present invention to provide an improved tire dressing dispensing apparatus with fluid application control that responds to movement of the tires of a particular vehicle as the vehicle moves through the carwash. With the tire dispensing apparatus of this invention, the size of the vehicle's tires are mechanically determined, a sensor or sensors determine the location of the vehicle's front tire and the speed that the front tires (and thereby the speed of all of the tires) move through the tire dressing dispensing portion of the carwash in cooperation with a control system, the sensors also determine the location of the vehicle's rear tires, and the control system integrates this information and logically determines the activation of the application and dispensing of the tire dressing fluid and the neutralizing fluid through nozzles selected for their designed distribution patterns and amounts of these fluids in a desired pattern and quantity.

SUMMARY OF THE INVENTION

Embodiments, including the technical features of the invention for which protection is sought, are illustrated and described herein and include a tire dressing apparatus, including an indexing system, an indexing system output member, an index system retention and return mechanism, a tire dressing application system, an indexable applicator with fluid distribution apparatus, an articulation mechanism, a truck and guidance system, and a control system.

The tire dressing apparatus is controlled by a carwash controller operated typically by an attendant at the carwash. The width of a vehicle entering the carwash is determined mechanically by an index arm, the identification of the vehicle selected for application of the tire dressing fluid to the vehicle's tires, and a programmable logic controller controls a spraying sequence by controlling the time intervals between the activation of solenoids controlling fluid release through nozzles during each vehicle tire dressing cycle. The programmable logic controller includes sufficient memory to keep track of the vehicle in the carwash que or in the carwash in the event of some mechanical or electrical interruptions to the carwash operation. A unique nozzle design has been provided to obtain the desired fluid distribution and coverage on the vehicle tires.

These and other objects and features of the invention will be better understood and appreciated from the following detailed description of one embodiment thereof, selected for purposes of illustration and shown in the accompanying drawings.

BRIEF DESCRIPTION OF THE DRAWINGS

FIG. 2b is a elevation view of the tire dressing apparatus in FIG. 1

FIG. 2c is another elevation view of the tire dressing apparatus in FIG. 1;

FIG. 15 is an end view, sectional view, and geometry of the restrictor included in the nozzle of this invention;

FIG. 16 is an elevation view and an end view of the nozzle body of a nozzle constructed in accordance with this invention;.

FIG. 17 is a side view and two end views illustrating the geometry of the slots in a preferred embodiment of the nozzle (it should be noted that in operation the slots are in the upper half of the nozzle);

FIG. 18 is another exploded view of a nozzle of this invention;

FIG. 19 is another perspective view of the assembled nozzle of this invention;

FIG. 20 is a photo illustrating the spray pattern of one preferred nozzle at distances of 3", 6" and 7" from a target surface.

DETAILED DESCRIPTION

Figure 1:
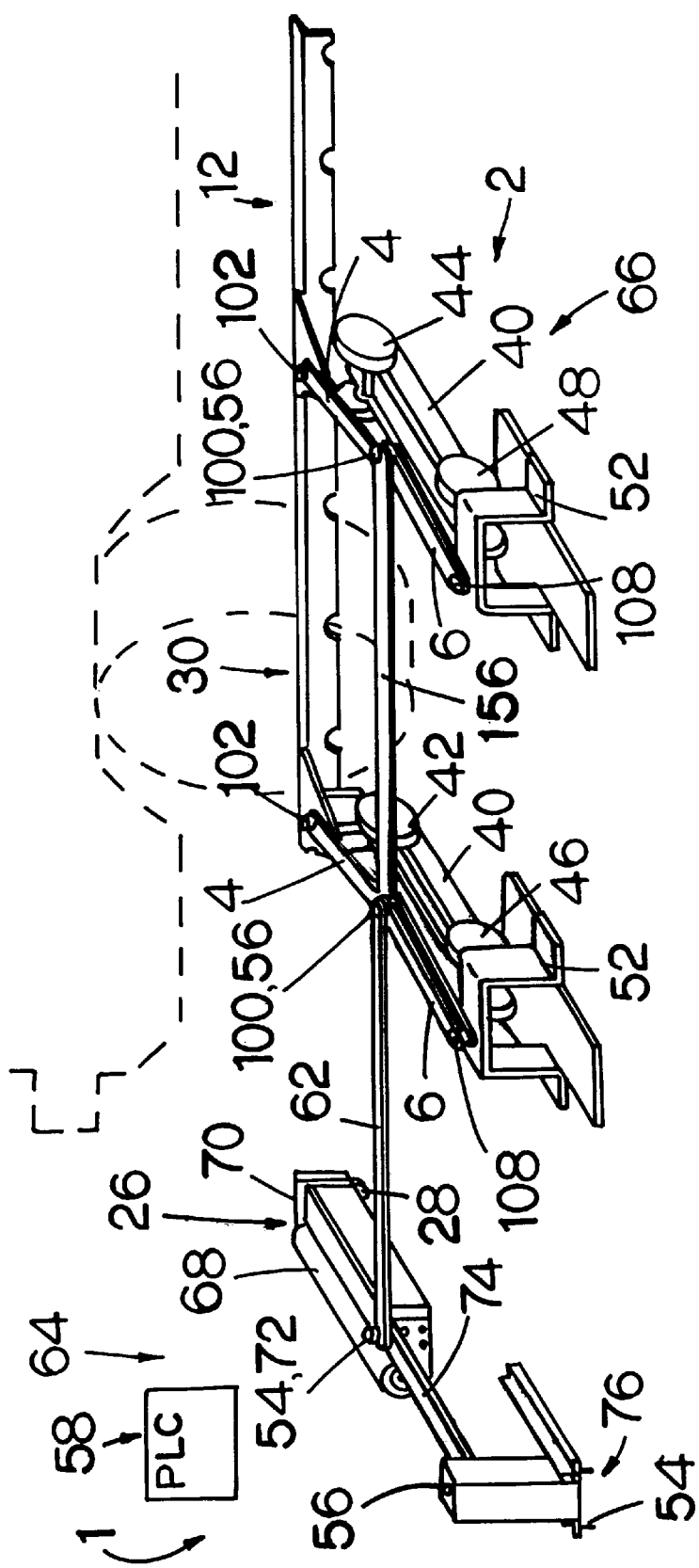
FIG. 1 is a perspective view of a tire dressing apparatus constructed in accordance with the present invention particularly illustrating the mechanism with some of the operating members removed for clarity.

Referring now to the drawings, there is shown preferred embodiments for the tire dressing dispenser of this invention, including the technical features of the invention for which protection is sought. The tire dressing apparatus is described in connection with an automatic carwash application to wash a vehicle and the tire dressing apparatus of the invention is particularly adapted for applying a tire dressing fluid to the vehicle's tires as the carwash equipment conveys the vehicle through the carwash and is characterized by providing an improved application of tire dressing fluid to vehicle tires with an indexable mechanism that adjusts the tire dressing apparatus to the size of each vehicle as the carwash equipment conveys the vehicle past the tire dressing fluid application location of the carwash.

The drawings show the tire dressing apparatus 1 located on one side of an automatic carwash apparatus. The drawings illustrate one of a pair of tire dressing apparatus and it will be understood that a fixed tire dressing apparatus is located on the other side of the vehicle.

The tire dressing apparatus includes an Indexing system 64 for interacting with front tires of a vehicle such that the indexing system moves between a first position and a second position in response to its interaction with the tire of the vehicle conveyed through the carwash. In one preferred embodiment the indexing system 64 illustrated in the drawings includes an index arm 26 and the vehicle front tire 136 contacts its respective index arm 26 as a carwash conveyor 14 conveys the vehicle through the carwash.

The vehicle front tire 136 contact the roller 68 on the index arm 26. The roller 68 is supported for rotation on a roller support bracket 70.

An index arm roller 28 rolls across the floor of the carwash facility as the index arm is moved by the vehicle front tires 136. A support bracket arm 74 supports roller support bracket 70 and support bracket arm 74 extends to and is pivotably attached to an indexing system mechanism 76 for pivoting by a pivot member 56 comprising, for example, a pin placed in a pin receiving opening and held in place by a suitable retention member that allows the desired pivoting motion.

An activating air cylinder or air cylinder 50 (air supply not shown) is attached to the indexing system mechanism 76. The air cylinder 50 is attached at one end proximate to pivot 56 and sufficiently offset to allow the lengthening and shortening of the air cylinder to move the support bracket arm 74 and all of the members attached or connected to the support bracket arm 74.. The other end of the air cylinder is attached to support bracket arm 74 for pivoting with a suitable pivot member 72.

The air cylinder 50 and the support bracket arm 74 are attached to a bracket support 78 that provides support for the indexing system members extending out from and index system support structure. The bracket support 78 is supported by the index system support structure 80.

A gear and pawl support structure 82 is located on an indexing system support base 84. The indexing system mechanism includes a latch gear 32 interacting with an indexing gear 34 that is attached to the support bracket arm 74.

The indexing gear 34 includes one or more gear teeth 86. Associated with the indexing gear 34 is a pawl 36. A pawl support member 88 that rotates or pivots about a pawl pivot axle 90 carries the pawl.

Attached to the pawl support member 88 is a pawl activating cylinder 92 that is attached at one end to the pawl support member 88 and at the other end to a pawl activating cylinder pivot axle 94. A pawl activating cylinder control located generally at 96 controls the movement of pawl activating cylinder 92. In one preferred embodiment the pawl activating cylinder is air activated (air supply line not shown).

One or more fastening members 54 attach the indexing support system base to the floor of the carwash facility. It will be understood that other suitable means of providing stability for this portion of the tire dressing apparatus could be used.

Extending from the indexing system 64 is an indexing system output member. In the illustrated embodiment, the indexing system output member is an index axle 62.

The index axle 62 is attached to the support bracket arm 74 at pivot member 72. The index axle at 62 extends from the indexing system 64 to a tire dressing application system 66.

The index axle 62 connects to a scissors linkage 98 by an index axle pivot member 100. The scissor linkage includes a scissor linkage connecting link member 156 and a pair of extended arms and pivot arms 4 and 6 connected to the scissor linkage connecting link member 156 by index axle pivot member 100.

Extended arm pivot members 102 attach the extended arms 4 to a spraying bar 12. In the embodiment illustrated in the drawings, the extended arms 6 include extended arm upper and lower members 104,106.

An upper and lower member pivot member 108 that provides for the desired pivoting movement of the extended arm upper and lower members 104, 106 attaches the extended arm upper and lower members 104, 106 to their respective guidance system support structures 110. Each guidance system support structure 110 is supported on a suitable support structure base 112 and is part of a guide track bracket 52.

It will be understood that the scissor linkage illustrated in the drawing figures and described herein includes two similar structures and the reference character members have been used to indicate similar structure in each part of the tire dressing application system 66. It should be further noted that while the presently preferred embodiment of the invention illustrated and described has a two each of the extended arms and pivot arms 4, 6, other embodiments may have either one each or more than two of the same members depending upon a particular application and use of the invention.

A support structure connecting member 114 joins the two halves of the scissor linkage 98 and additional connecting members can be used if required to provide stability to the invention. In one preferred embodiment the support structure connecting member is used to support an electrical junction 118 or other suitable connection bus contained in an electrical junction or connection bus housing 120.

A tire dressing reservoir 122 and a neutralizer reservoir 124 provide a supply of dressing fluid and neutralizer fluid. The dressing fluid and the neutralizer fluid reservoirs connect to a fluid manifold 126. The fluid distribution system generally identified by reference character 38 provides for distribution of the respective fluids from reservoir, to pump, to manifold, to solenoid and to respective fluid distribution devices.

Extending from the manifold 126 are tire dressing supply tube. 128 and neutralizer supply tube 130. It will be seen from the drawings that the tubing incorporates the necessary tubing fittings, elbows and other connections 132 to extend the tubing from the manifold to the spraying bar 12 that is adjacent to conveyor 14 that conveys the vehicle through the carwash system in which the present invention is installed.

A pump station 16 transfers the tire dressing fluid and the neutralizer fluid from their respective reservoirs, to the fluid manifold 126 and finally through the respective supply tubing out to the fluid distribution devices carried by the spraying arm 12. In a preferred embodiment, the fluid distribution devices are a plurality of nozzles attached to the spraying arm 12 by support brackets 134.

The dressing spray nozzles are indicated by reference character 20 and reference characters 22 and 24 represent neutralizing spray nozzles. Fluid distribution through the nozzle openings 60 of each nozzle is controlled by a solenoid 18 mounted upstream of the nozzle.

The support bracket includes a safety bar 30. The safety Oar contacts the vehicle if the indexing system should fail and is intended to reduce the amount of any damage to either the dispensing apparatus or the vehicle as well as signal retraction to the control system.

A control system in one preferred embodiment is a programmable logic controller 58 that controls the operation of the tire dressing apparatus and the application of the dressing and the neutralizing fluids. A wiring harness represented by reference character 116 extends from the programmable logic controller represented by reference character 58 through the junction box or the panel 118 to wiring connections for the solenoids 18 for controlling the application of the dressing fluid or the neutralizing fluid, respectively.

As scissors linkage 98 moves or indexes in and out in response to movement of the index ale 62 and spray bar 12 moves in concert, this assembly is supported by a truck and guidance system 2. This includes a truck 40 supported on rollers 42, 44, 46 and 48. It will be recognized that the scissors linkage 98 moves as it is acted on by index axle 62 and the truck 40 moves in and out, away from and toward the vehicle tires along a path generally perpendicular to the path of the vehicle and the vehicle tires.

In operation, in connection with the carwash application previously mentioned to wash a vehicle with automatic carwash equipment, as the vehicle moves into the vicinity of the tire dressing apparatus 1, the vehicles front tire activate an air operated floor switch 8 and then activate air operated floor switch 10. The front tire of the vehicle contacts the indexing system 64 and moves the index arm 26 when the vehicle front tire 136 impact the index arm as the carwash conveyor 14 conveys the vehicle through the carwash.

As the vehicle front tire 136 contacts the roller 68 on the index arm 26 and as the index arm is moved out of the way by the vehicle tire, the roller 68 rotates on roller support brackets 70 and the bracket rolls across the floor of the carwash facility on index arm roller 28.

It will be understood that the index arm may in fact not move if the tire size is such that the spray arm 12 is already in the desired position. The drawing figures show that the indexing arm moving and thereby moving the rest of the apparatus in two situations for a larger tire and then the largest tire. It will be understood that the tire dressing apparatus is intended to operate with a wide range of vehicle and tire sizes.

As the index arm 26 moves inward, pawl member of latch gear 32 interacts with gear teeth 86. When the index arm is indexed to its desired position by the vehicle front tires, the pawl 36 holds the latch gear 32 in the desired position until the control system indicates that the vehicle has passed through the tire dressing apparatus.

At that time, another signal is sent to the pawl activating cylinder control and the pawl is moved out of engagement with gear teeth 86 of indexing gear 34 and the activating air cylinder extends the indexing arm back to its first or zero or reset position in preparation for the next vehicle.

As the indexing system 64 is indexed by the vehicle tires, the indexing system output member acts on the scissors linkage 98 through the index axle 62. If the vehicle tire is larger than the initial tire size set up for the tire dressing apparatus and therefore, the location of the spraying bar 12, the entire spraying bar is moved while rolling on the truck and guidance system 2 away from the conveyor 14.

Figure 12:
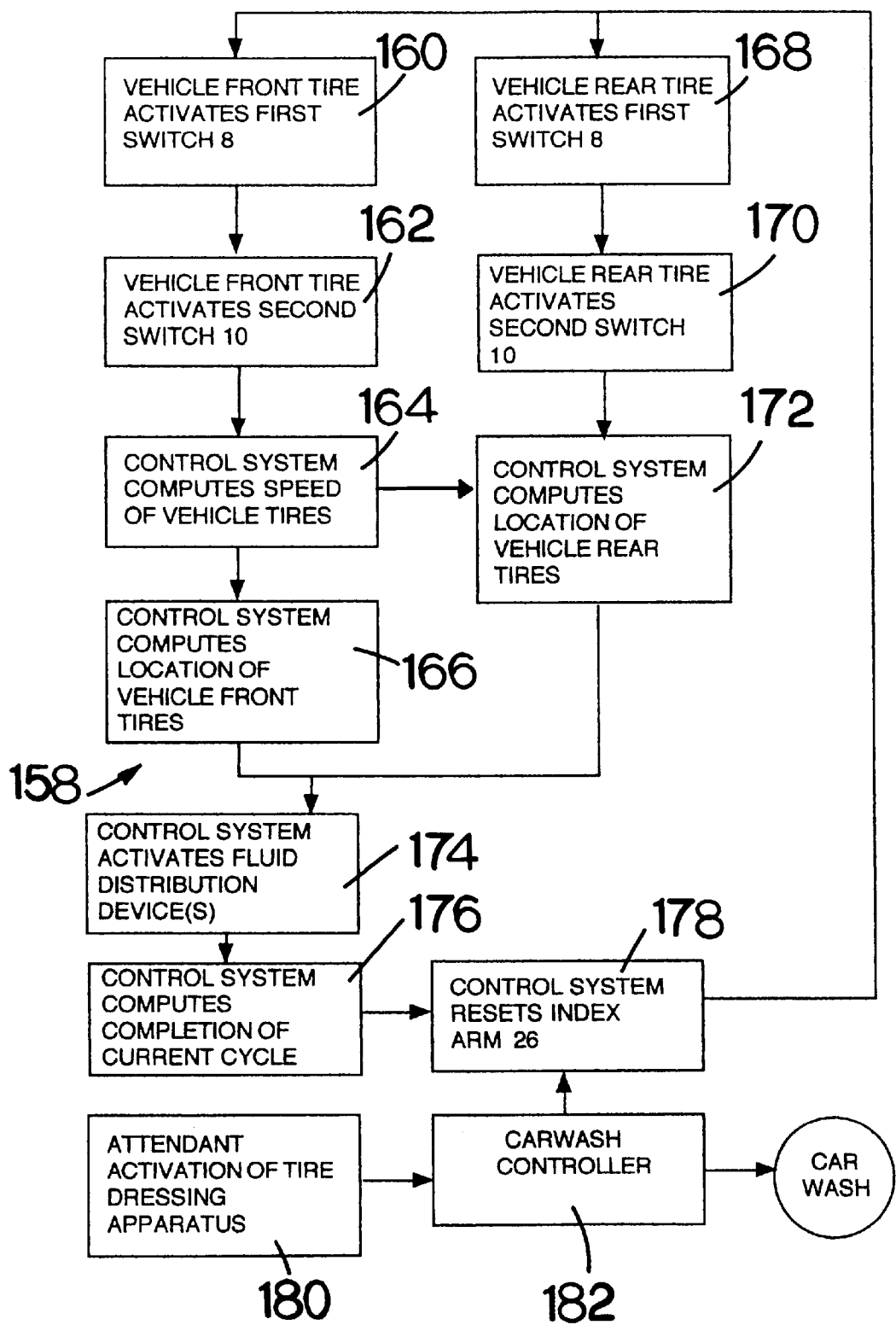
FIG. 12 is a diagram of one preferred operation of the tire dressing apparatus.
Figure 13:
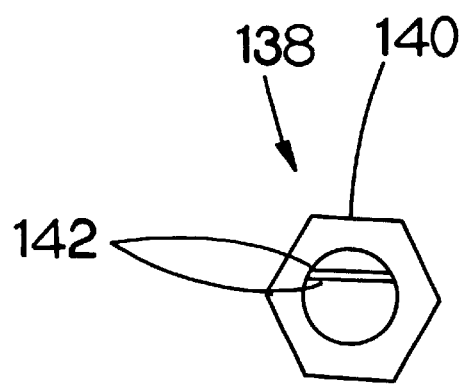
FIG. 13 is a perspective view of a nozzle constructed in accordance with the present invention.

Referring now to FIG. 12, as the tire dressing application system 66 including the spray bar 12 and its associated nozzles and solenoids is moved to the desired position, the control system comprised of the programmable logic controller 58 in one preferred embodiment senses the passage of the vehicle front tires as they activate the first air switch 8 as represented by reference character 158 on the flow diagram. The vehicle front tire then activates the second switch thereby providing the appropriately programmed programmable logic controller with the speed of the vehicle passing through the tire dressing apparatus on the conveyor of the carwash. The following or vehicle rear tire activates the first switch and then activates the second switch again and with this second activation of the floor switches 8 and 10, the programmable logic controller now knows the length of the vehicle and the location of both the front fire and the rear tire of the vehicle.

FIG. 12 illustrates an operational flow chart for a preferred embodiment of this invention. Reference character 160 represents the vehicle front tire activating the first air switch 8 and then the vehicle front tire activating the second air switch 10 at 162. The control system at 164 takes the information provided by the activation of the two air switches by the front vehicle tire and computes the speed of the vehicle tires. A control system at block 166 computes the location of the vehicle front tires and the control system then is prepared as indicated at block 174 to activate the fluid distribution devices.

Meanwhile the vehicle rear tire activates the first air switch 8 as indicated at block 168 and then activates the second air switch 10 as indicated at block 170. This information, that is, the passage of the rear tire over the air switches in addition to the speed of the vehicle tires provides the control system indicated at block 172 with the location of the vehicle rear tires.

The control system then activates the fluid distribution devices as indicated at block 174 for the vehicle rear tires.

As indicated at block 176, the control system, knowing the speed and the location of the front tires and the rear tires, now can compute completion of the current tire dressing distribution cycle and after the tire dressing fluid and the neutralizing fluid have been distributed as desired, the control system resets as indicated at block 178 and the control system is prepared for the next vehicle being pulled through the carwash by the conveyor. Resetting, in a preferred embodiment includes extending the index arm to an extended position.

In a preferred embodiment, the control system comprises the programmable logic controller 58. The programmable logic controller is programmed in any one of the known control languages, for example, Ladder Logic, and incorporates the necessary and known components in order to function as described as will be understood by one skilled in the art.

In a preferred embodiment, the tire dressing apparatus operates in the following fashion. The vehicle stops at the location of a first attendant for the carwash and the vehicle owner requests or purchases a carwash package that includes tire dressing. The attendant activates 180 the appropriate switch or button and the driver of the vehicle proceeds to a stop line exits the vehicle, the car is prepared for the carwash and then put on the conveyor.

Figure 2A:
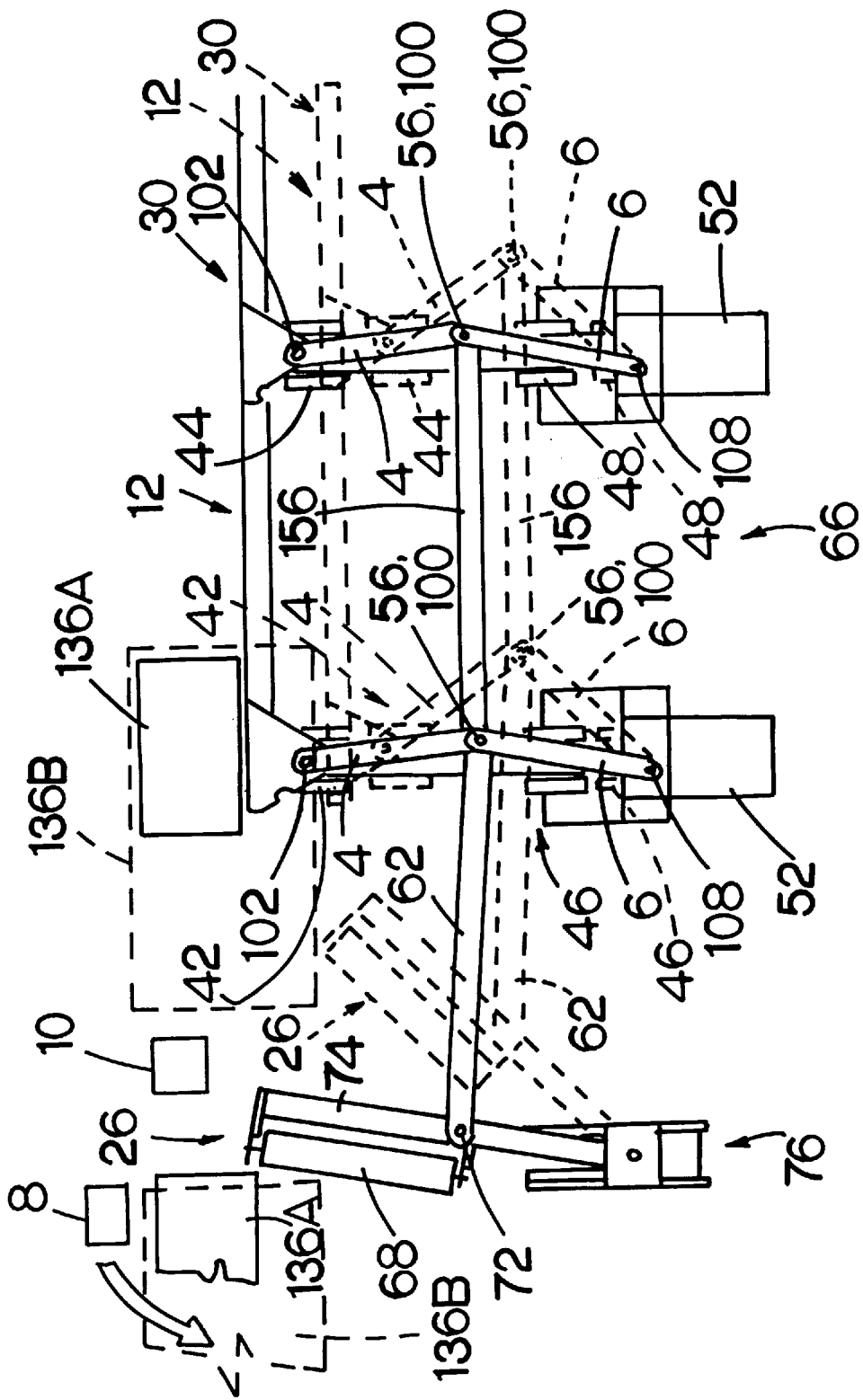
FIG. 2a is a plan view of the tire dressing apparatus depicted in FIG. 1 illustrating the apparatus in two positions in response to two different vehicle tire sizes.
Figure 3:
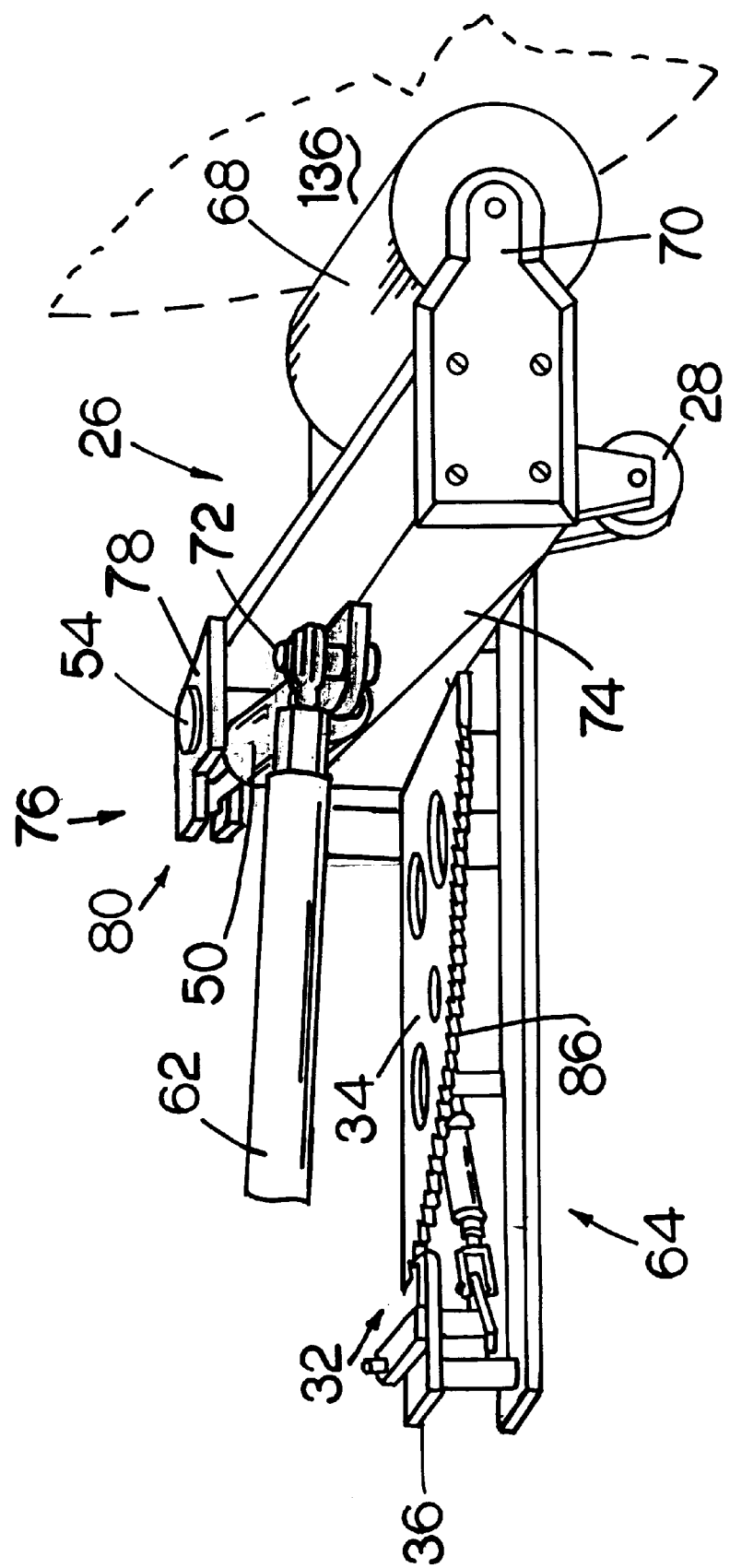
FIG. 3 is a perspective view of an indexing system of the invention.
Figure 4:
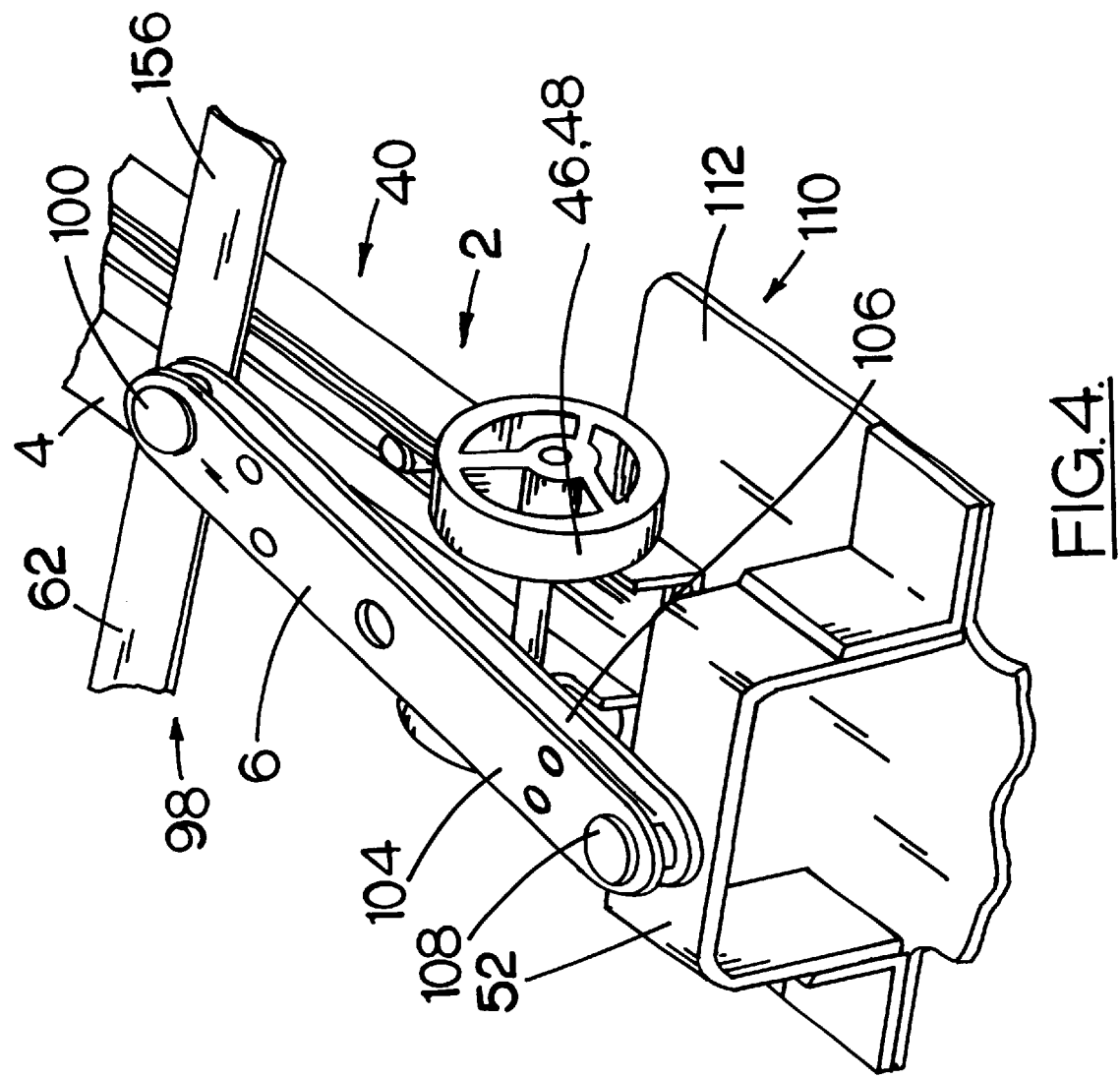
FIG. 4 is a perspective view of a truck and guidance mechanism of the invention.
Figure 5:
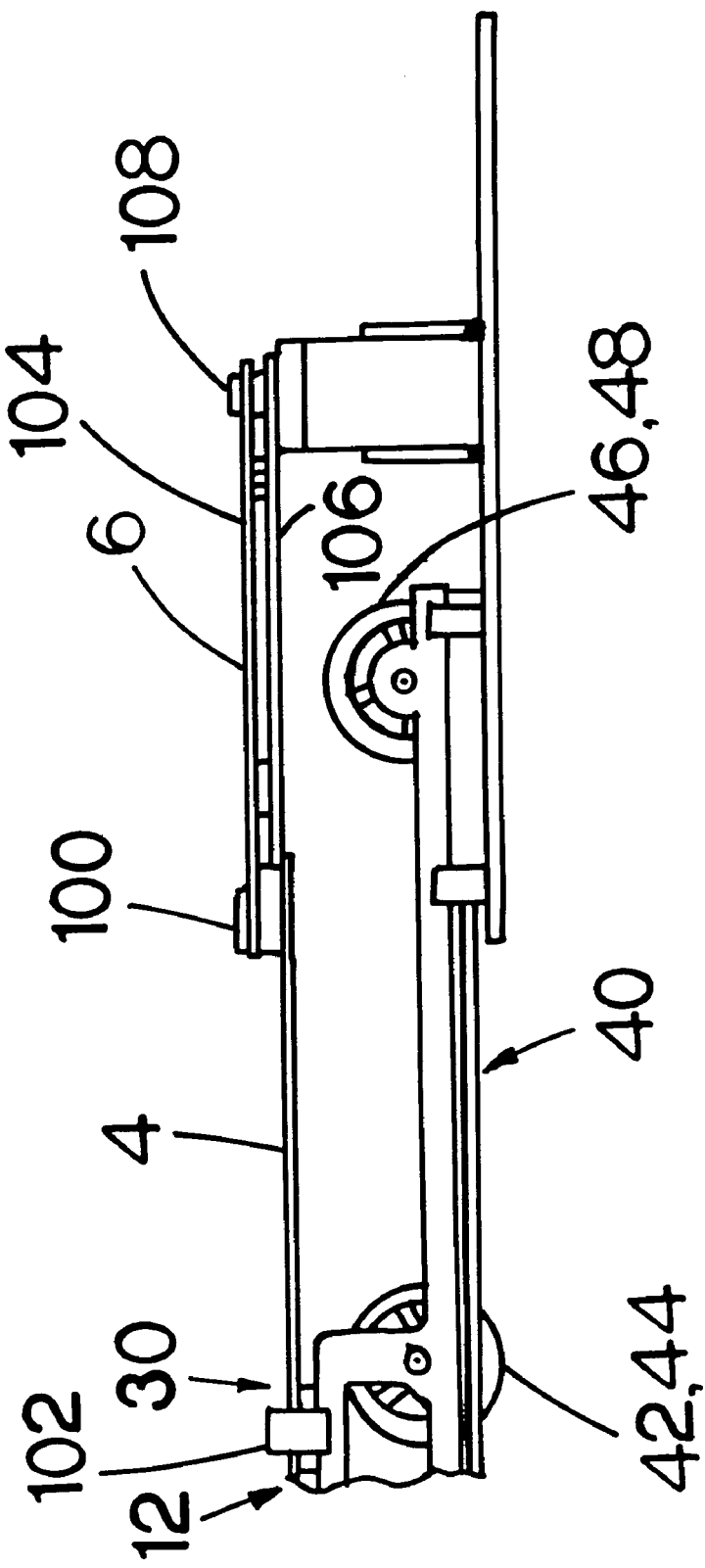
FIG. 5 is an elevation view of the truck and guidance system illustrated in FIG. 4.
Figure 6:
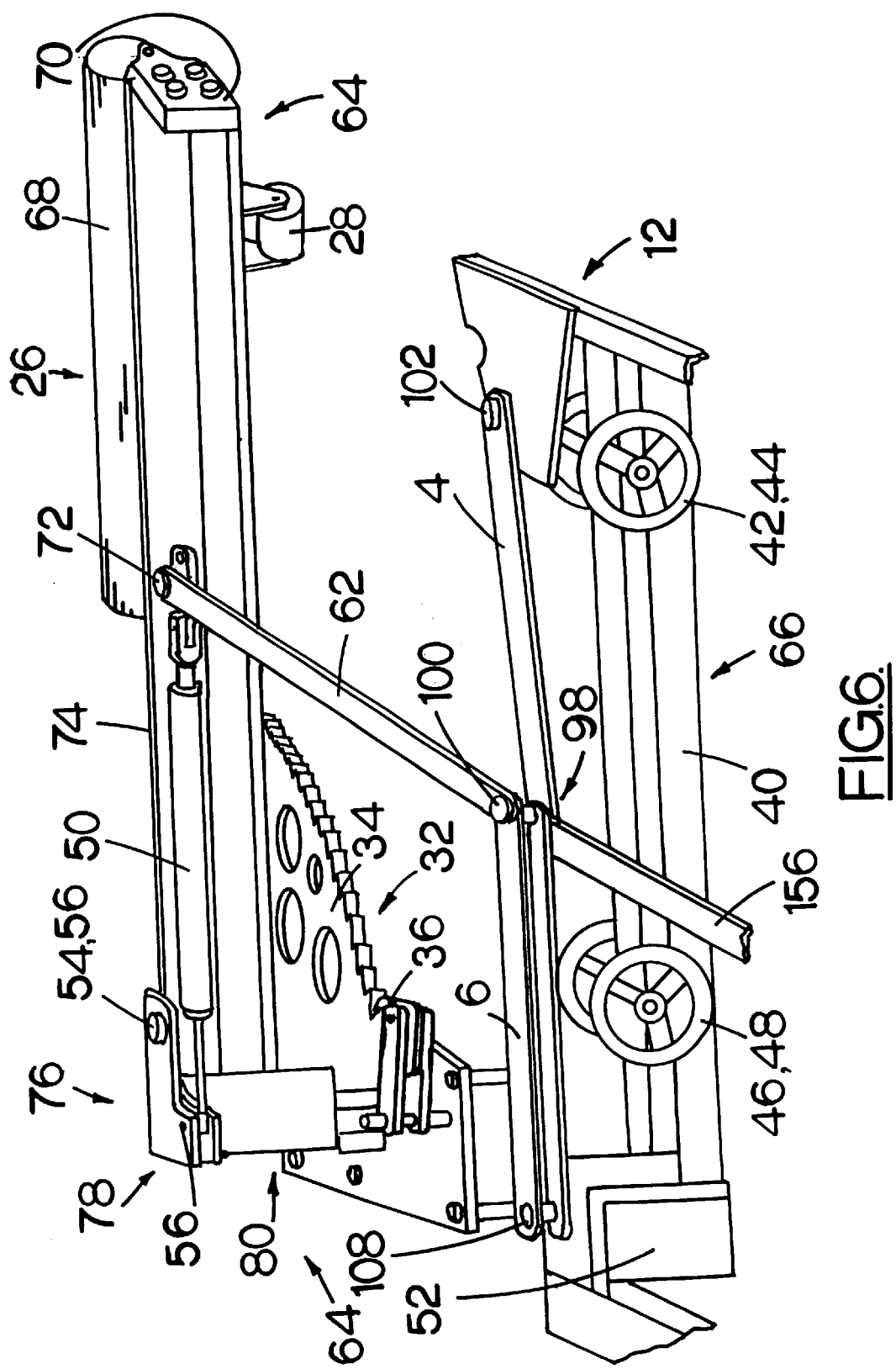
FIG. 6 is a perspective view of an index system and partial view of the truck and guidance system and tire dressing application system.
Figure 7:
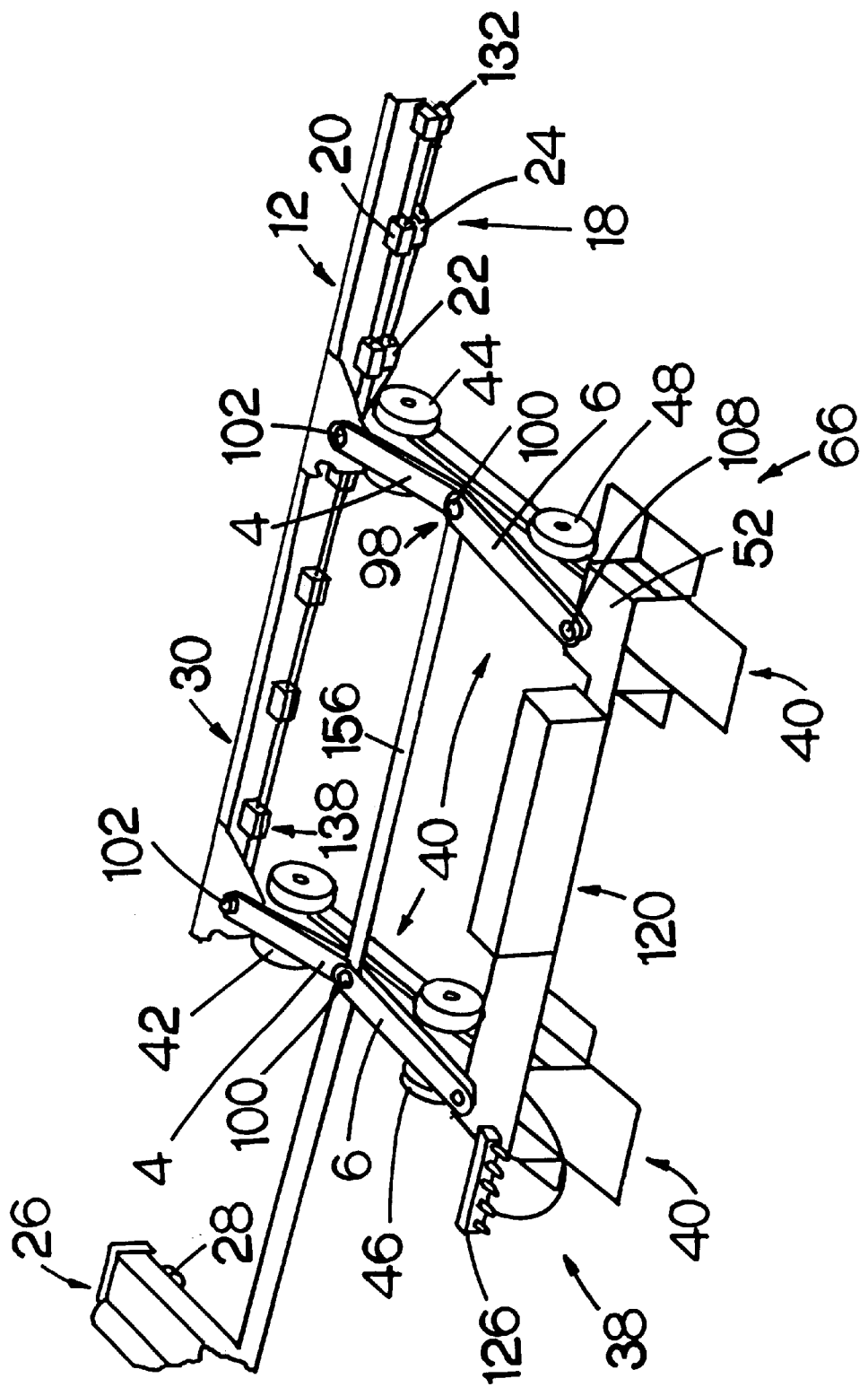
FIG. 7 is a perspective view of the tire dressing apparatus in FIG. 1 showing the location of nozzles, solenoids and tubing;.
Figure 8:
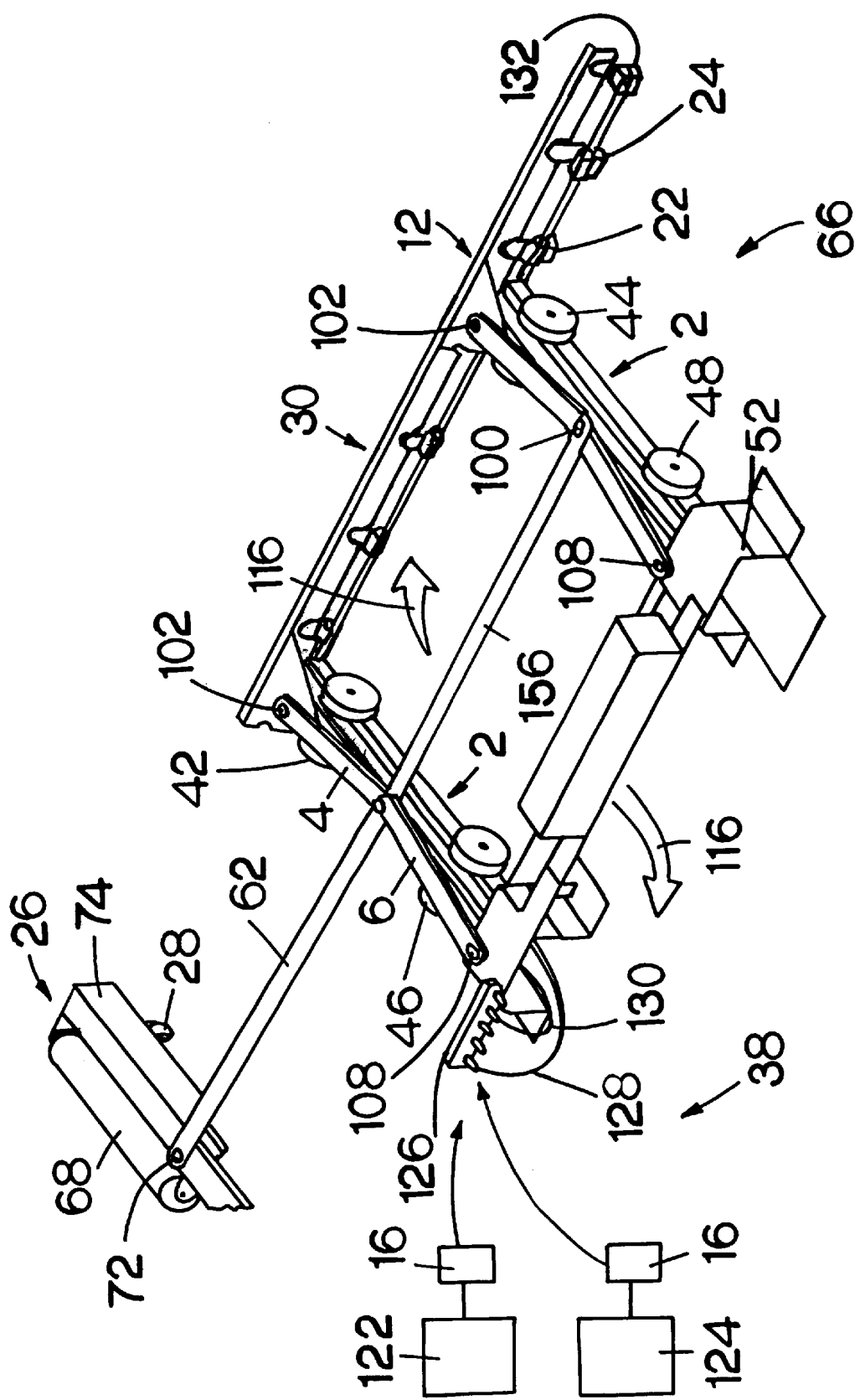
FIG. 8 is another perspective view of the tire dressing apparatus.
Figure 9:
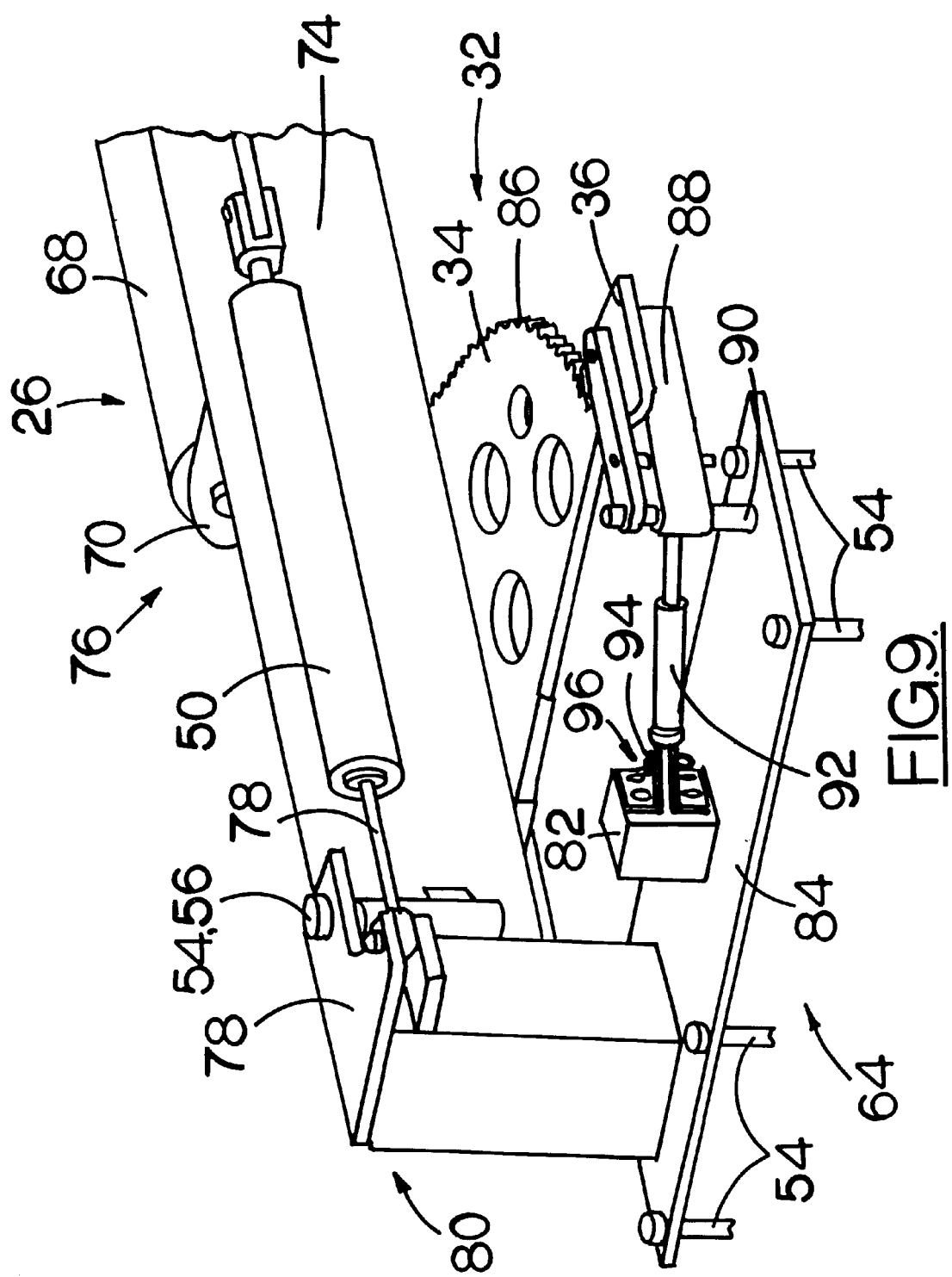
FIG. 9 is another perspective view of the indexing system of the tire dressing apparatus.
Figure 10:
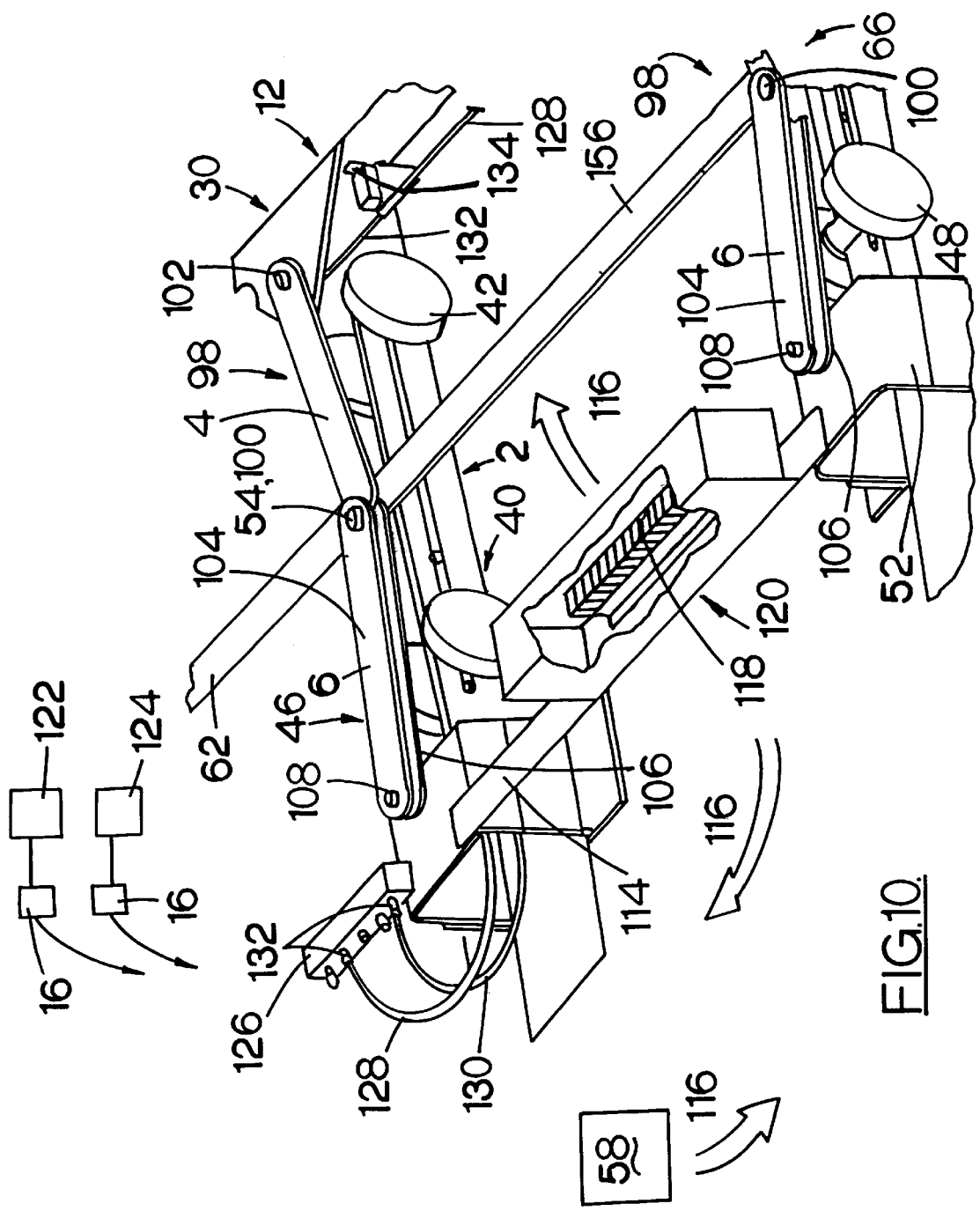
FIG. 10 is another perspective of the tire dressing apparatus showing fluid and electrical connection locations.
Figure 11:
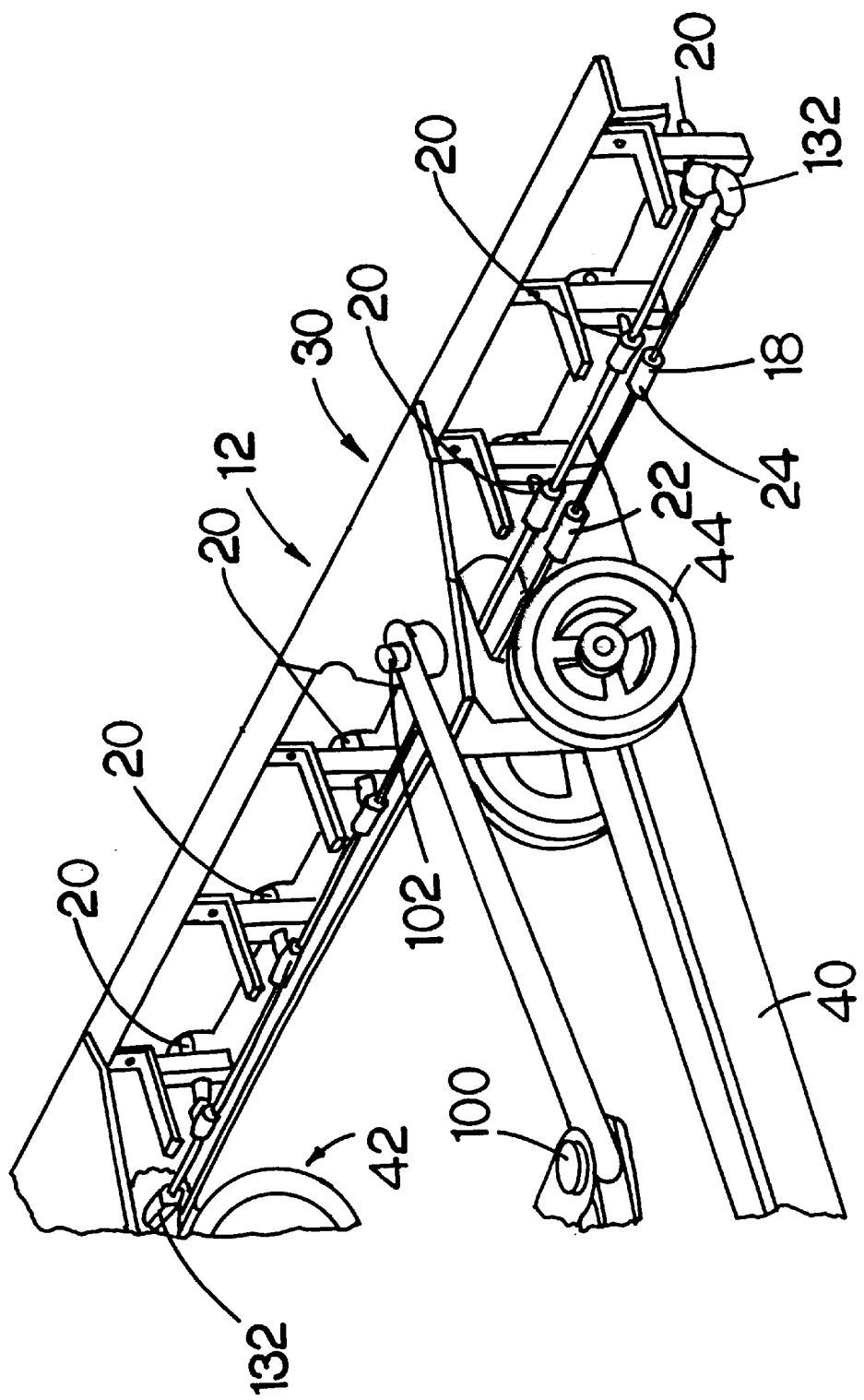
FIG. 11 is a partial perspective view illustrating one embodiment of nozzle and tubing arrangements.

The vehicle is washed according to the preset program and as the vehicle approaches the tire dressing apparatus, it becomes the car in front of the index arm 26 and the index arm 26 is activated by the carwash controller 182 by swinging out to an extended position. The vehicle front tire makes contact with the index arm and pushes the index arm back until the tire slides past as illustrated in FIG. 2*a* for two different size vehicle tires. Once the tire dressing apparatus is indexed, the spray arm is in place for that particular vehicle.

As previously discussed, two air operated floor switches, one in front 8 and one in back 10 of the index arm are tripped by the vehicle tires to provide information to the control system so as to activate the fluid distribution devices, since the tripping of the air switches indicates to the control system, the speed of the conveyor and the vehicle tires being pulled through the carwash the solenoids are activated in a pre-determined sequence.

The nozzles spray in sequence from left to right as viewed from an observer facing the side of a vehicle as it moves from the left to the right through the carwash. At the time the first dressing fluid nozzle starts spraying, the neutralizing nozzles begin spraying a neutralizing solution, for example, water to dilute the dressing fluid or a detergent on the floor of the carwash in front of the rolling vehicle tire to act as an antisurfactant. This neutralizing material is sprayed through nozzles at an angle of approximately 45 degrees from the spray bar.

The dressing fluid dispensing nozzles have a spray pattern discussed below and can be described as spraying with an "inverted smiling face" design. A preferred embodiment of the nozzle sprays two and one half inch by six inch pattern on the surface of the tire. Since the nozzles are stationary once the apparatus is indexed for a particular vehicle, the nozzle sprays this pattern at that point in time that the tire is touching the floor in front of each nozzle.

When the vehicle rear tire has been sprayed by the last nozzle, the cycle ends and the machine is ready for the next signal from the attendant that tire dressing is desired. The entire dispensing cycle is controlled by the programmable logic controller or other equivalent control system. The programmable logic controller receives its signal from the carwash controller and is therefore, capable of remembering where in the carwash cycle, the vehicle that is to have the tire dressing applied. The programmable logic controller is provided with the capability of remembering where in the overall carwash cycle the vehicle is if there is any interruption in power or operation of the carwash apparatus.

The present invention is designed to work with a now generation of tire dressing fluids that can be applied to a wet tire. One such product will be manufactured by ZEP and is tentatively identified as ZEP Tire Dressing Product X5699 (X indicates a prototype product).

Figure 14:
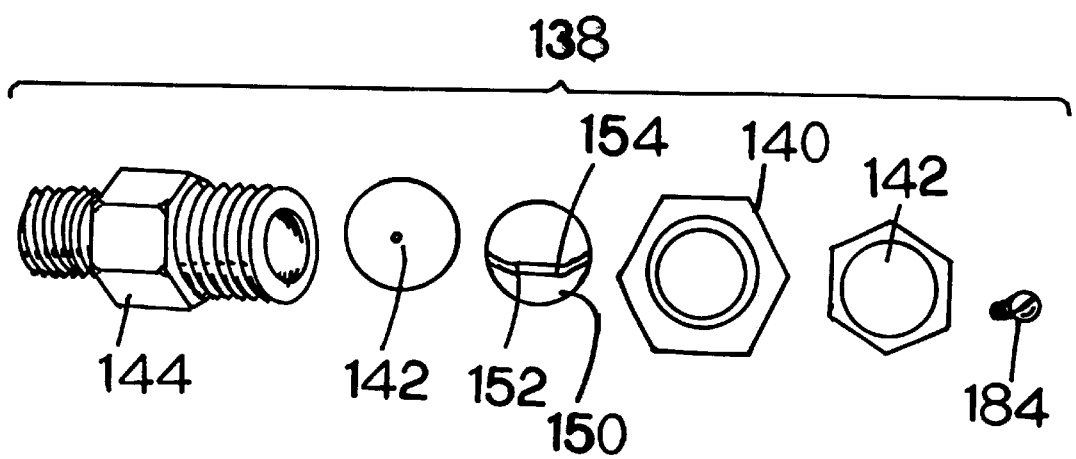
FIG. 14 is a modified exploded view of the components of a nozzle constructed in accordance with the invention.
Figure 21B:
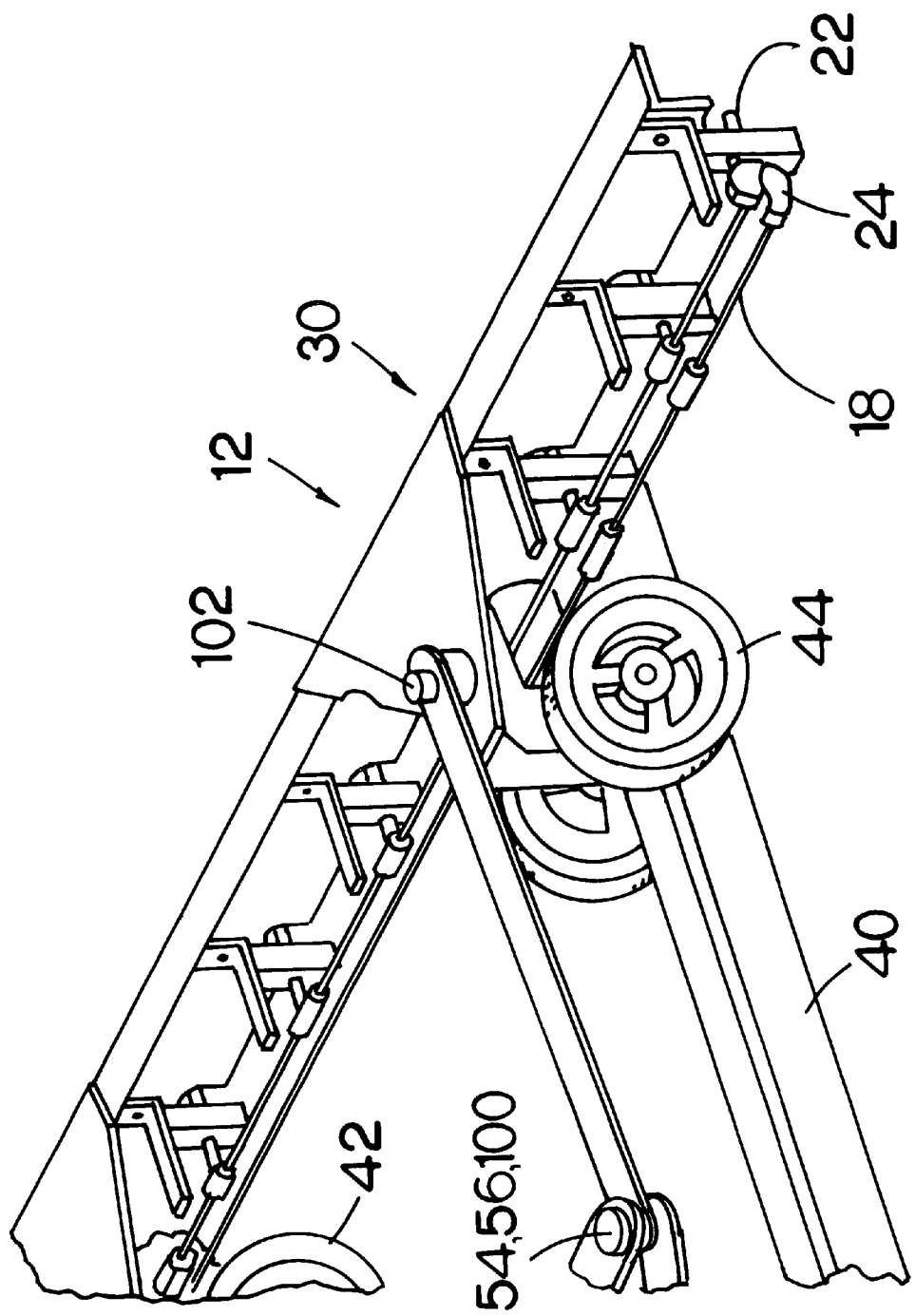
FIGS. 21a–21s are views of one preferred embodiment of the invention.
Figure 21C:
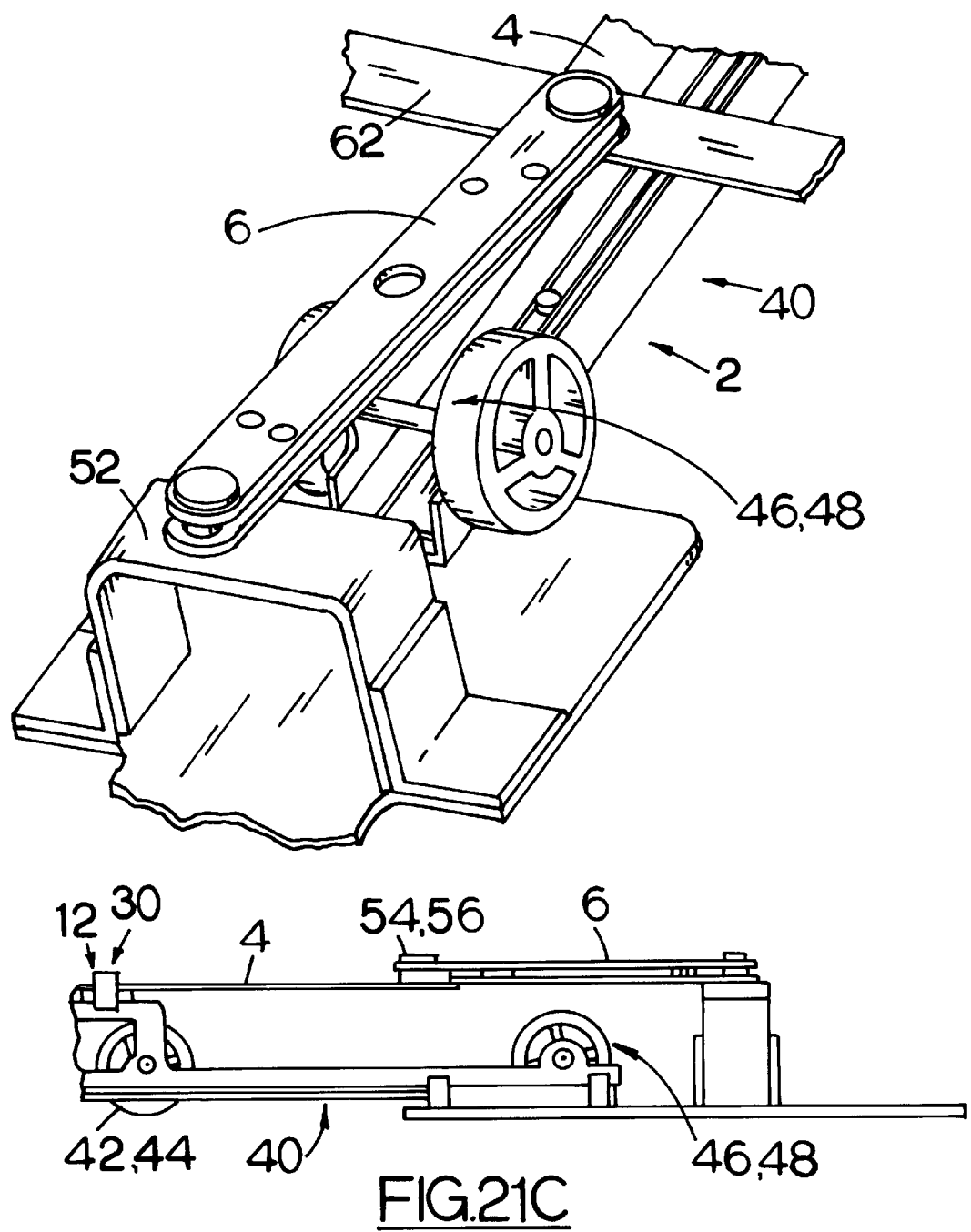
Figure 21D:
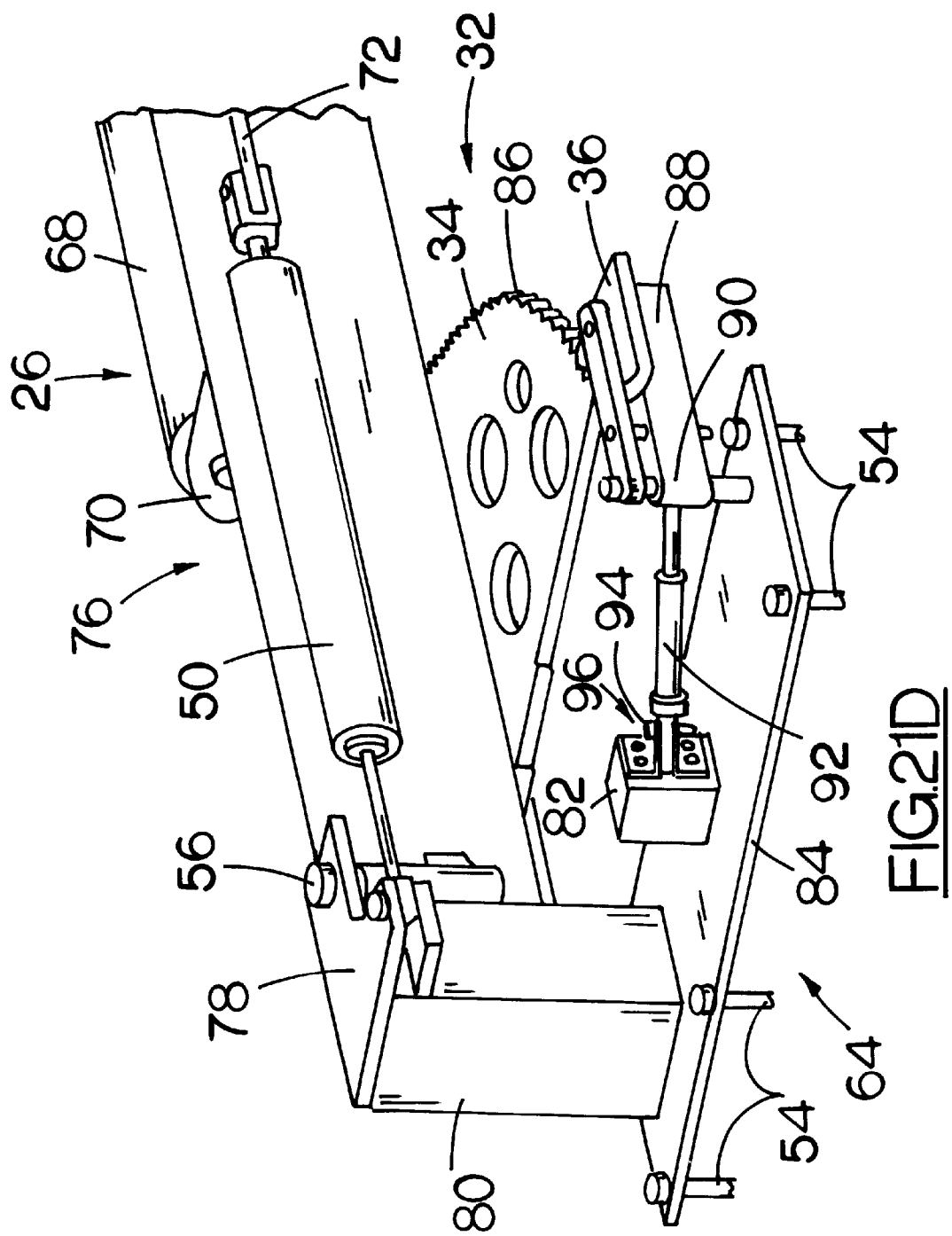
Figure 21E:
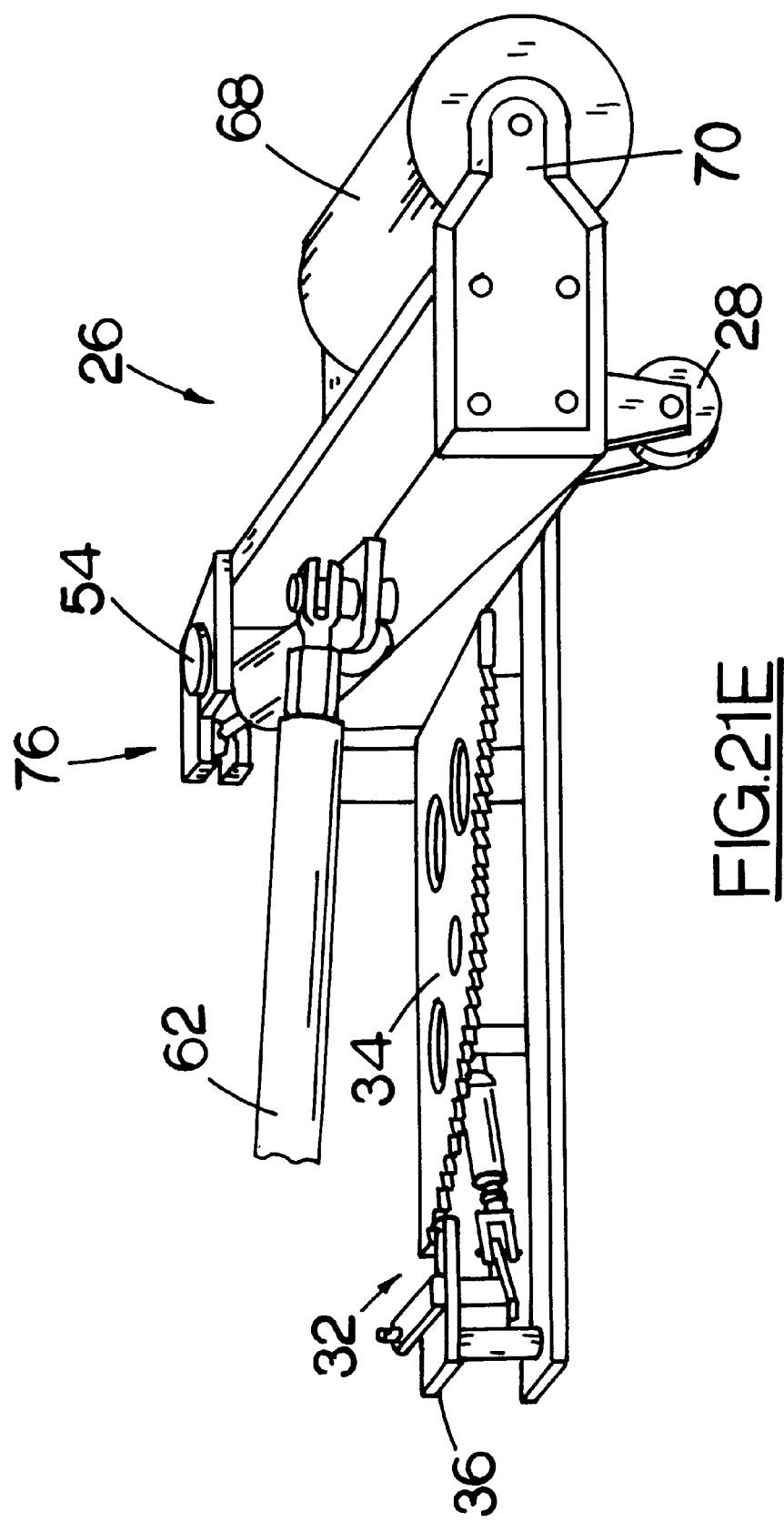
Figure 21G:
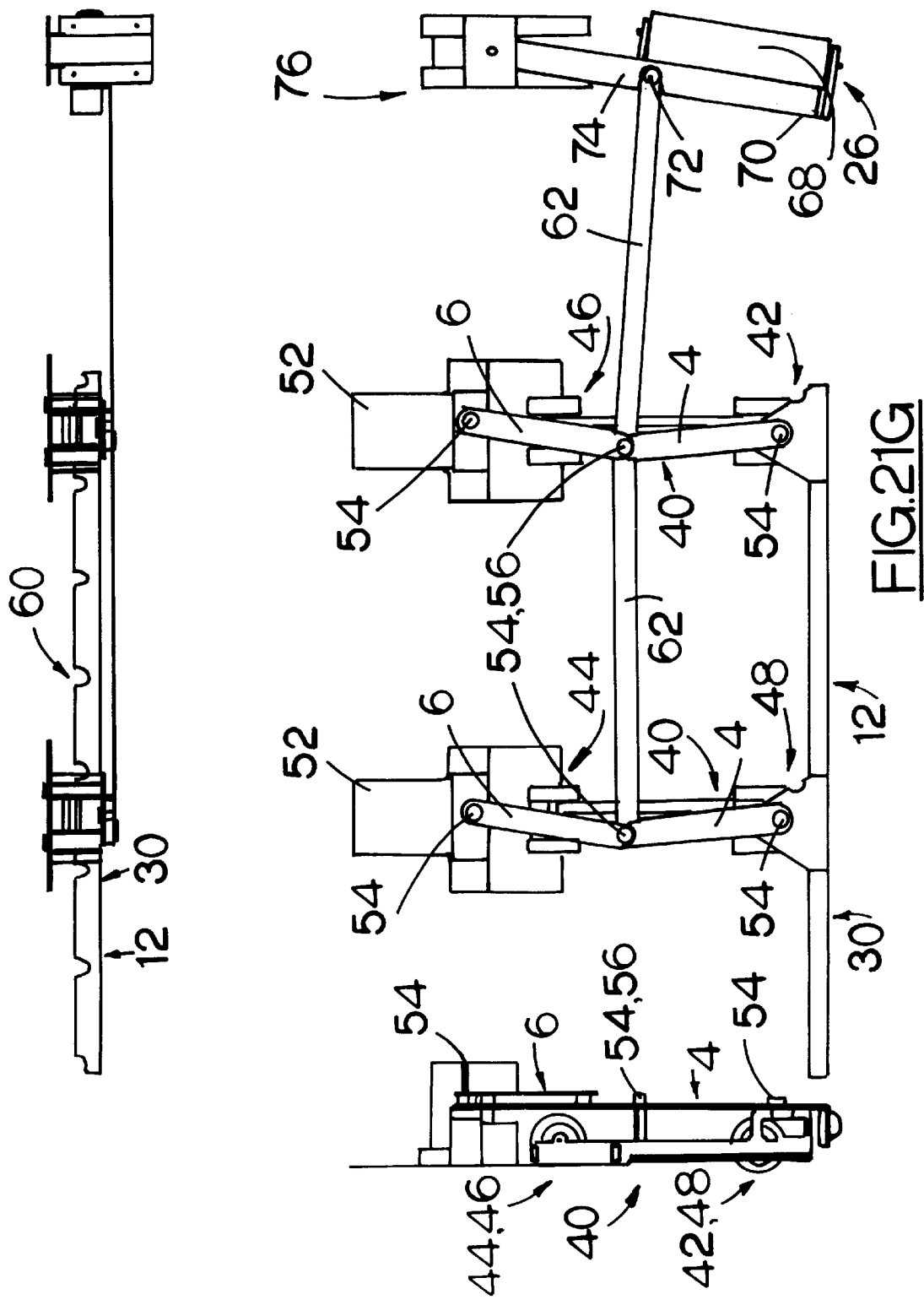
Figure 21H:
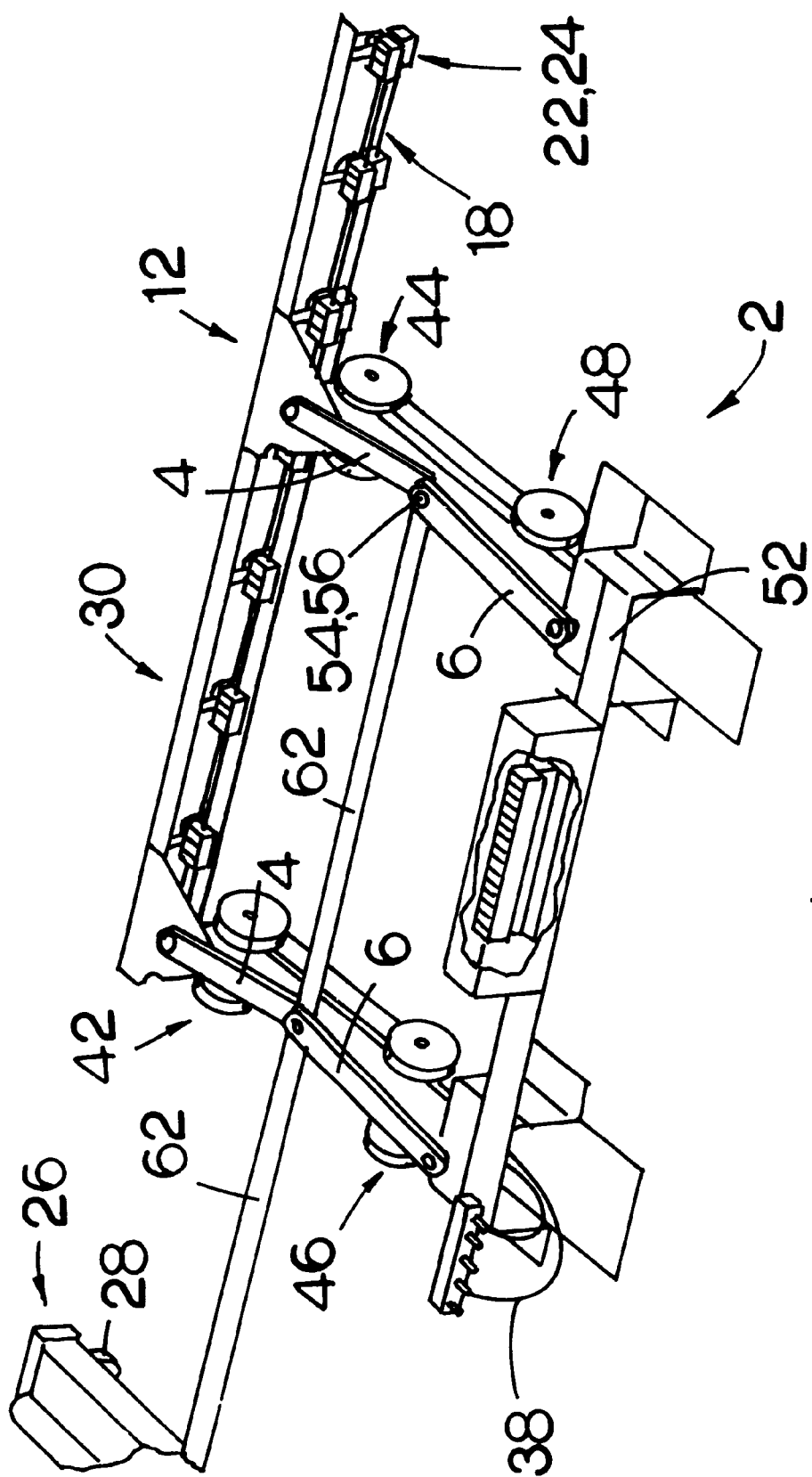
Figure 21I:
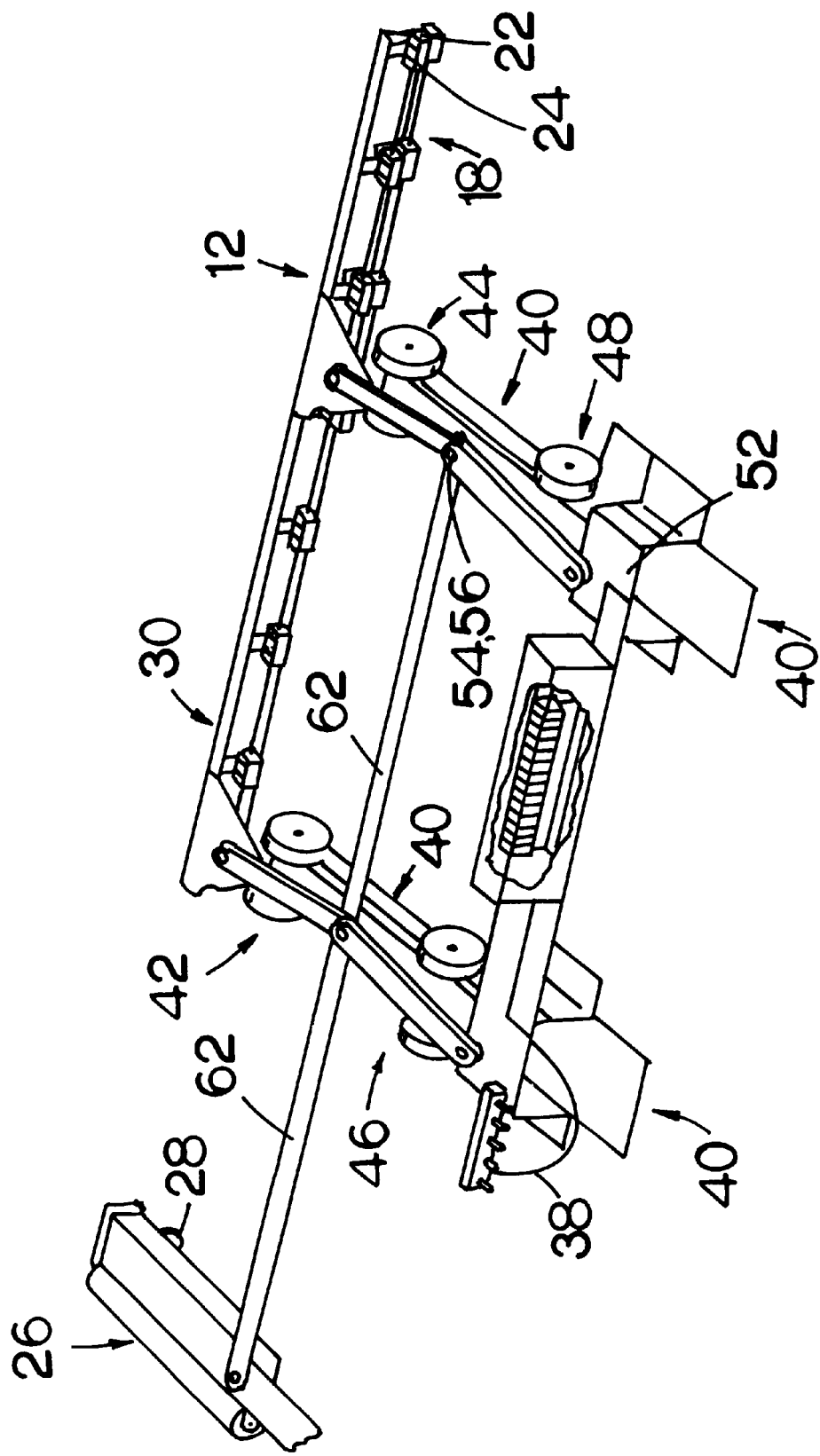
Figure 21J:
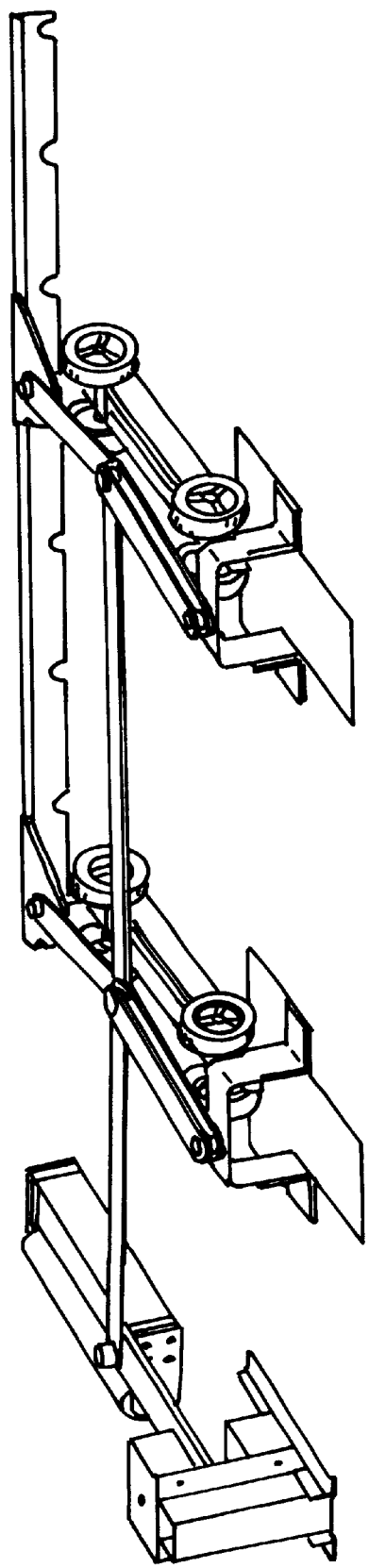
Figure 21K:
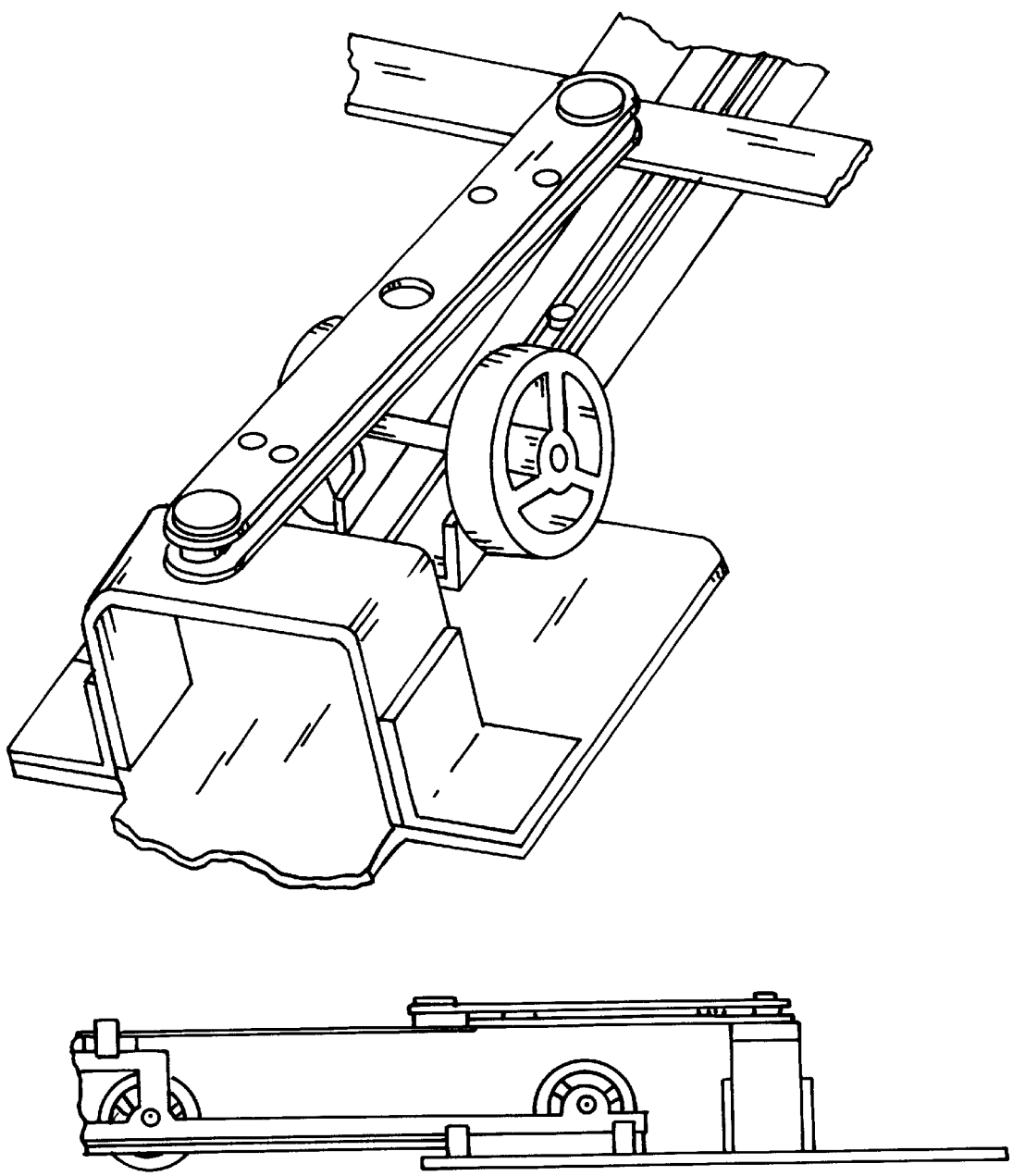
Figure 21N:
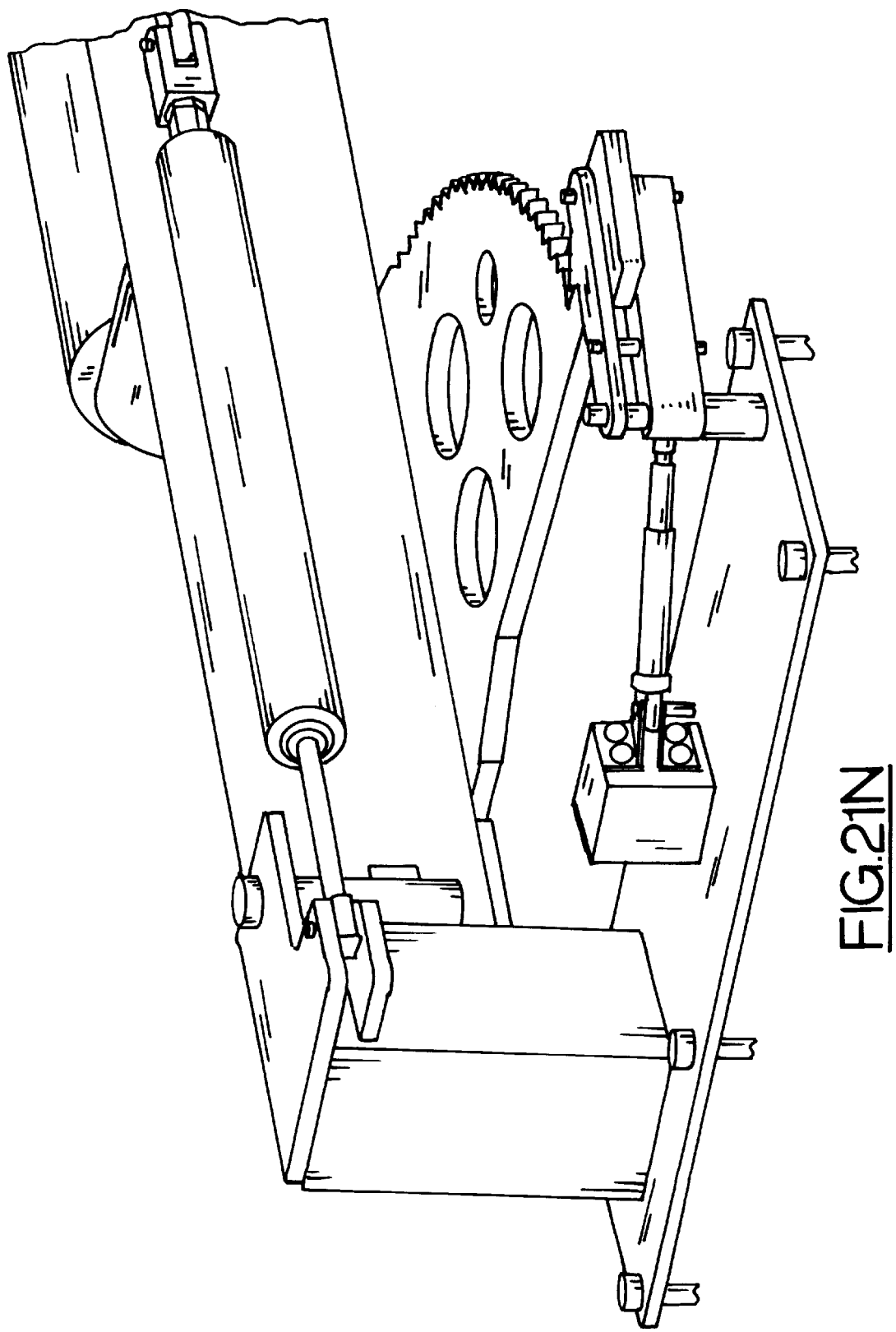
Figure 21O:
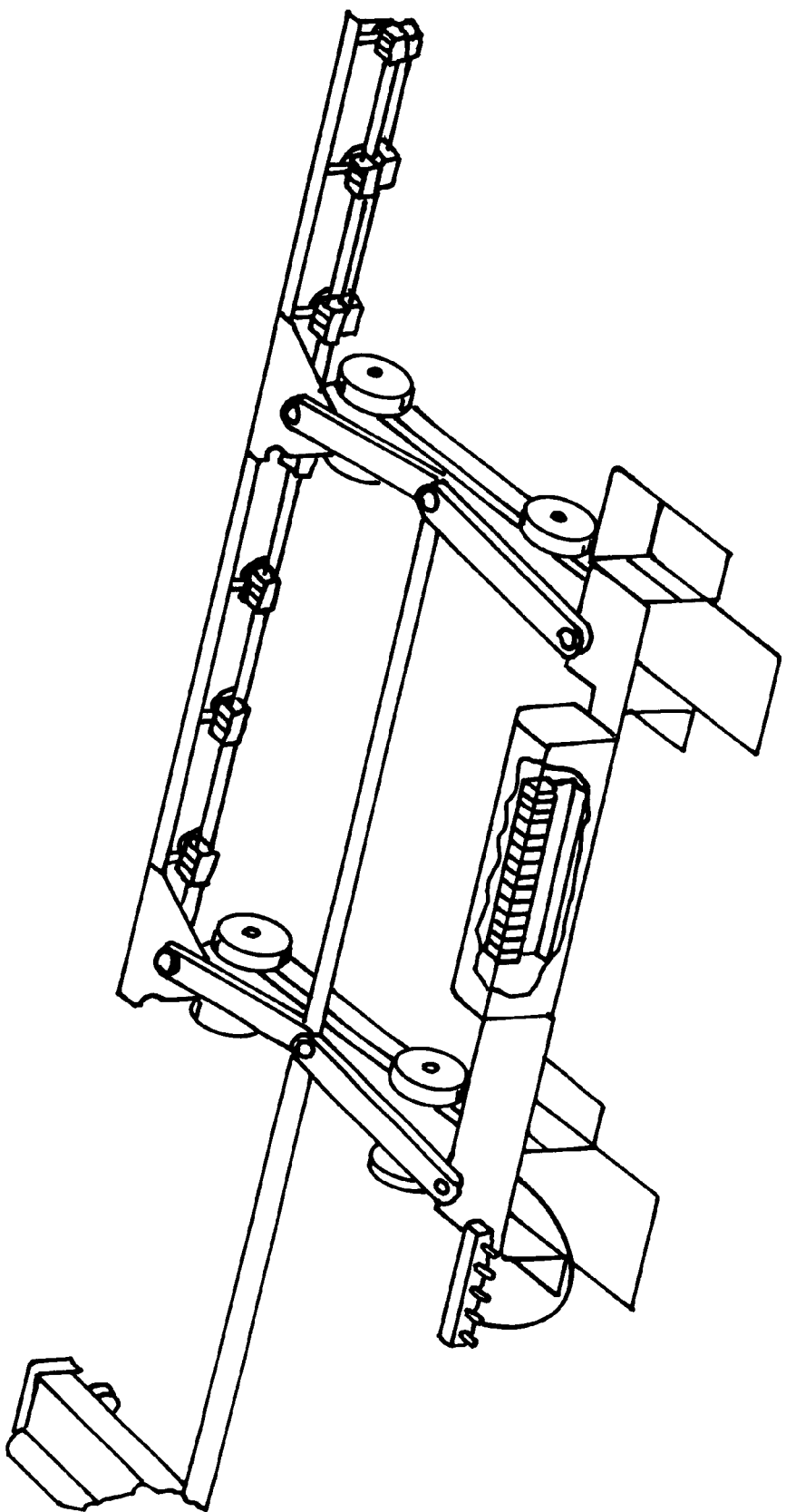
Figure 21P:
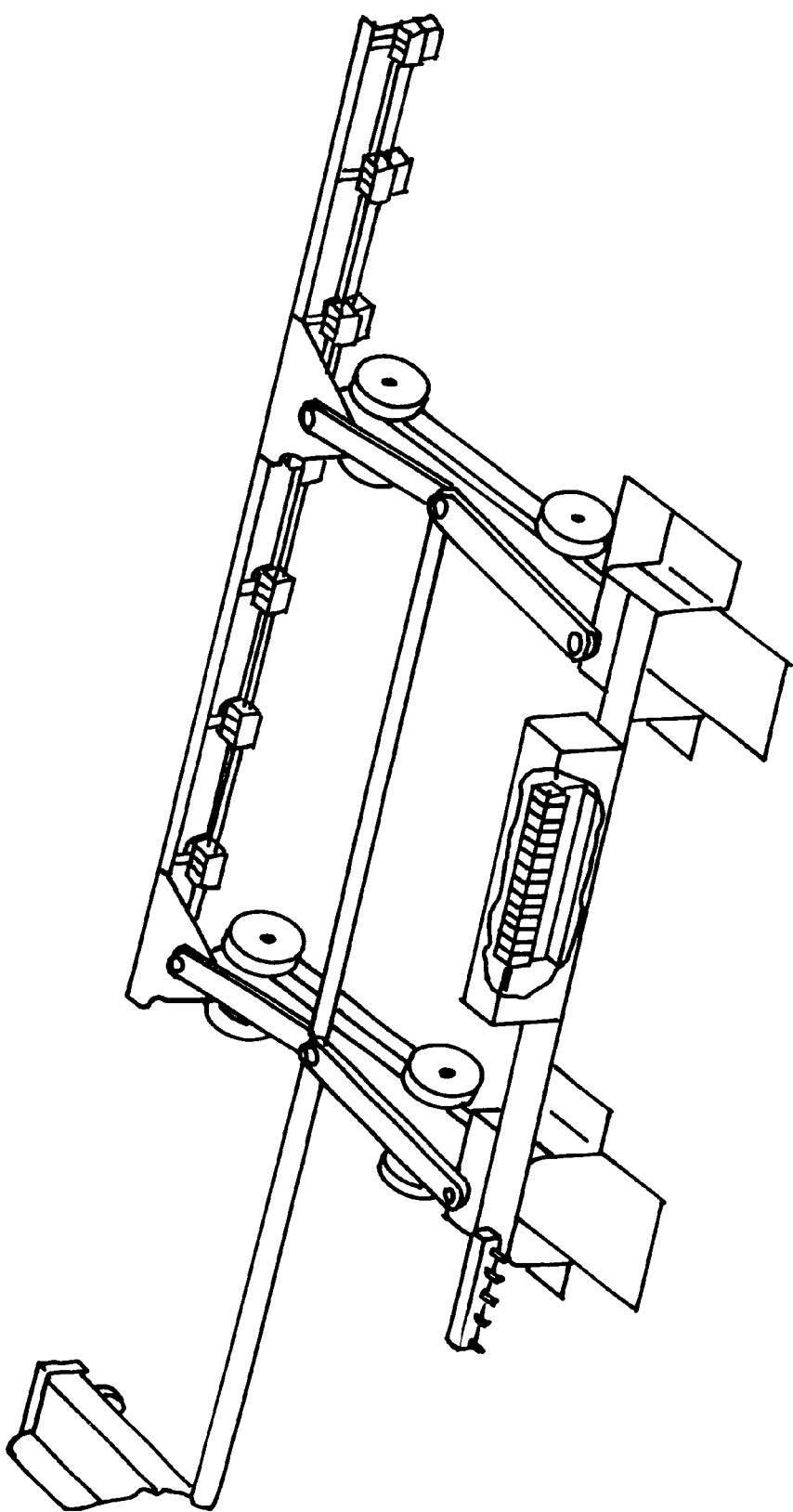
Figure 21Q:
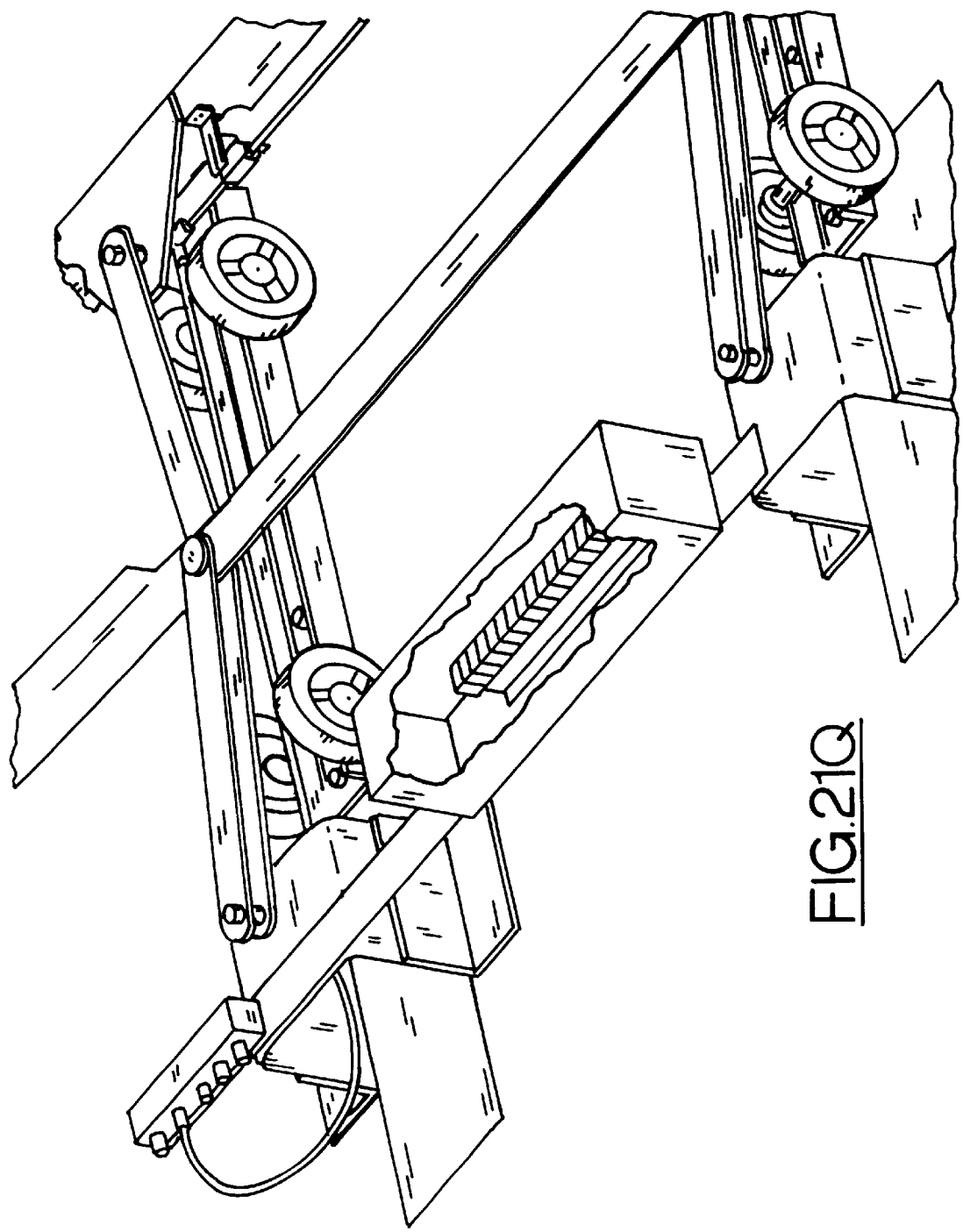
Figure 21R:
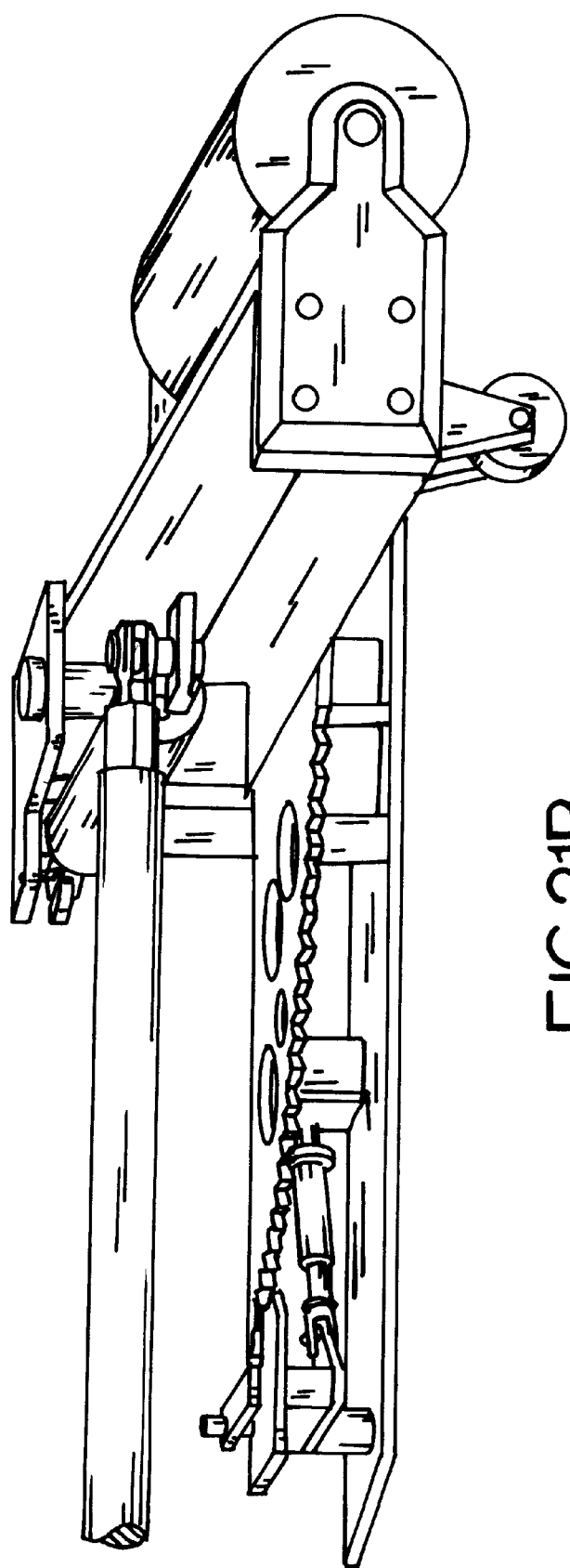
Figure 21S:
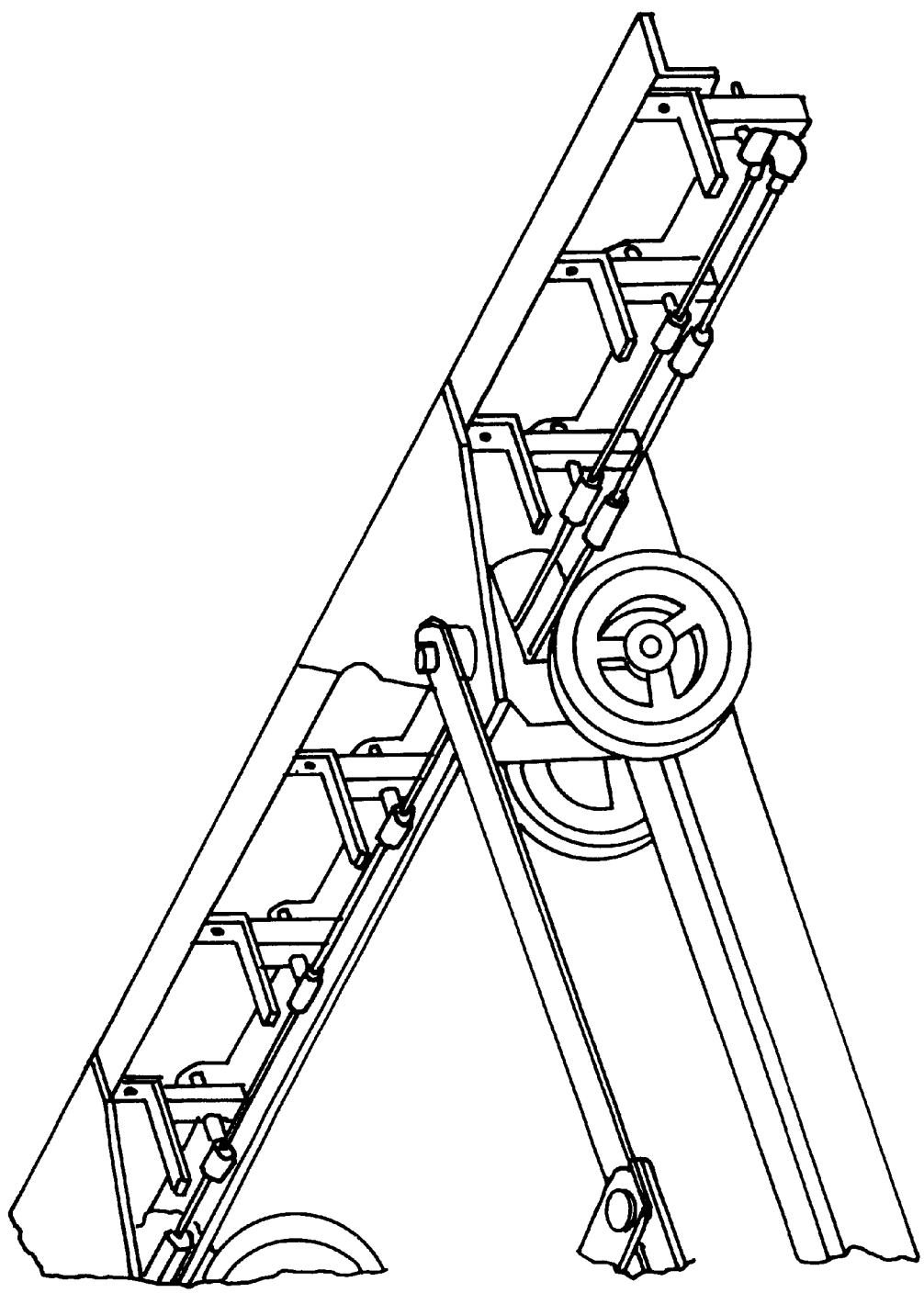

A nozzle constructed in accordance with the present invention includes a nozzle body 138, a nozzle diffuser with a focus ring 140 and a nozzle orifice 142. The nozzle assembly is further illustrated in a semi-exploded view in FIG. 14, is a nozzle assembly in accordance with one preferred embodiment of the present invention. The nozzle assembly includes a nozzle inlet and connector indicated at 1 (reference character 144), an orifice 142 indicated by no. 2, no. 3 is the nozzle face 150 and first opening 152 and second opening 154. No. 4 shows the nozzle diffuser and focus ring assembly and no. 5 is part of the assembly and provides some of the compression for compressing the orifice 142 within the nozzle body 138. No. 6 represents a set screw 184 for holding the focus ring diffuser 140 in place once its desired position is attained.

FIG. 15 illustrates a preferred embodiment of the restrictor orifice of the nozzle of this invention and shows the machining requirements to obtain the orifice and elliptical chamfer desired for a preferred embodiment of the nozzle.

FIG. 16 illustrates two more views of the nozzle body 138 separate from the rest of the nozzle assembly; and FIG. 17 shows the geometry for the first opening 152 and second opening 154 for nozzle face 150. It will be understood that FIG. 17 shows two end views and an intermediate elevation that describes the dimensions for one preferred embodiment of the nozzle of this invention.

FIGS. 18 and 19 show another view of the nozzle parts for nozzle body 138 with a partially exploded view from the side in FIG. 18 and a perspective view shown in FIG. 19.

In operation, the tire dressing apparatus fluid distribution devices represented by the nozzles of a preferred embodiment operate at a pressure of approximately 60 psi or lower. At 60 psi the fluid is dispensed in a relatively straight stream while at lower pressures, the fluid stream exiting the nozzle tends to disperse. A sample spray pattern is illustrated in the photo included as FIG. 20.

In a preferred embodiment of the tire dressing apparatus and nozzle described herein, it will be understood that a preferred embodiment of this invention includes the described nozzle used in conjunction with the operation of the programmable logic controller. It will be seen that once the programmable logic controller determines the speed of the vehicles tires passing through the carwash, then the nozzle must spray in its target area. In a preferred embodiment, this area is considered to extend from approximately 6:30 on a clock face on the passenger's side of a vehicle and 5:30 on a clock face on the driver's side of a vehicle, if a vehicle is viewed as moving from the left side to right through the carwash. This location is selected since it helps carry the product, that is the tire dressing product, up the tire as the tire is turning as the vehicle is pulled through the carwash by the conveyor.

It is believed that this nozzle design and tire dressing apparatus keep dressing fluid to a minimum and distribute the dressing fluid so that it would spread on the tire surface. As described above, the nozzle includes an orifice disk inside tho nozzle body that meters the amount of tire dressing product sprayed onto the tire.

The end of the nozzle includes a distributor that spreads the product across the tire surface. There is also a focus ring that can be extended to focus the spray onto the tire. The focus ring would be used as an adjustment on a location by location basis in response to the type of traffic types of vehicles and the wind velocity going through the carwash tunnels that is often a product of the air driver operation. The purpose of the focus ring is to maintain a stream of tire dressing fluid and reduce the amount of tire dressing fluid that atomizes due to conditions within the carwash tunnel.

Referring again to the distributor, the distributor includes the face of the nozzle with the double nozzle outlets that help concentrate the tire dressing product on the tire surface. This was done to overcome a technical problem due to the vast variety of tire sizes manufactured and the desire to install only a single nozzle in the tire dressing apparatus. This also helped overcome the technical problem presented by applying tire dressing fluid to the low profile tire found on most sports cars. Spraying the tire dressing product too high would allow the product to spray on the rim of the vehicle.

One of the ways this was accomplished is by observing that the two openings or slits on the nozzle front are not centered on the nozzle front. This design allows the nozzle to concentrate the spray to the extreme outside of the tire without overspraying or missing the tire completely. It should be kept in mind that in operation, the first and second openings 152 and 154 on the nozzle face 150 of the distributor are on the upper half of the nozzle face or as was previously referred to in the "upside down smiling face" configuration.

All specific embodiments have been shown and described, many variations are possible. Particular size and shape of the different components of the tire dressing apparatus may vary or be changed as desired to suit the carwash equipment in which it is used. The materials may vary although it will be understood that materials suitable for use in a carwash environment are preferred. The configuration and number of spraybars and scissor linkages may vary depending upon the size and number of nozzles desired, although the preferred embodiment includes nine nozzles, two of which spray in a neutralizer and seven of which spray the tire dressing fluid. Summarizing the features of the present invention, the tire dressing apparatus is activated by a carwash controller and the width of a vehicle passing through a carwash is mechanically determined by an indexible arm. A programmable logic controller provides the control system and controls the spraying sequence that is at timed intervals between the operation of the solenoids as a vehicle passes through the tire dressing dispensing location of the carwash. The safety bar 30 provides a safety mechanism that operates in such a way that if for some reason the adjustable spray bar releases or goes to the narrower or inner position, this bar, preferably a plastic, would bump the tire, side, bumper, etc. and then on contact would retract immediately to its widest spray position. This feature is built into the control system of the tire dressing apparatus in a known manner.

In a preferred embodiment, the pumping stations are activated by air solenoids. In a preferred embodiment, it should take only approximately three and one half ounces of tire dressing fluid to cover each tire. Another feature of a preferred embodiment of the fire dressing apparatus and nozzle combination is a speed in which the solenoid valve can now open to spray the tire dressing product or the neutralizer. In a preferred embodiment, the programmable logic controller energizes each solenoid coil or less than one quarter of a second and this allows a full spray pattern to cover the tire as the tire rotates.

Having described the invention in detail, those skilled in the art will appreciate that modifications may be made of the invention without departing from its spirit, therefore, it is not intended that the scope of the invention be limited to the specific embodiment illustrated and described. Rather, it is intended that the scope of this invention be determined by the appended claims and their equivalents.

The technical features of the invention for which protection is sought and claimed is:

1. A tire dressing apparatus, comprising:
   an indexing system, the indexing system interacting with a tire of a vehicle, the indexing system movable between a first position and a second position in response to the interaction between the indexing system and the tire;

an indexing retention mechanism, the indexing retention system maintaining the indexing system in the second position;

an indexing system output member, the indexing system output member movable in response to movement of the indexing system between the first position and the second position;

an indexing system return mechanism, the indexing system return mechanism returning the indexing system from the second position to the first position;

an indexable applicator, the indexable applicator connected to the indexing system output member, the indexable applicator movable from a first position to a second position in response to movement of the indexing system output member;

a fluid distribution device, the fluid distribution device carried by the indexable applicator; and a control system, the control system controlling operation of the tire dressing apparatus.

2. A tire dressing apparatus as set forth in claim 1 wherein the indexable applicator comprises an articulation mechanism.

3. A tire dressing apparatus as set forth in claim 2 wherein the articulation mechanism includes a truck and guidance system.

4. A tire dressing apparatus as set forth in claim 1 wherein the fluid distribution device comprises a nozzle.

\* \* \* \* \*